US007412576B2

(12) United States Patent
Yagawa

(10) Patent No.: US 7,412,576 B2
(45) Date of Patent: Aug. 12, 2008

(54) REMOTE COPY SYSTEM HAVING MULTIPLE DATA CENTERS

(75) Inventor: Yuichi Yagawa, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 277 days.

(21) Appl. No.: 11/008,466

(22) Filed: Dec. 8, 2004

(65) Prior Publication Data

US 2006/0123212 A1    Jun. 8, 2006

(51) Int. Cl.
*G06F 12/16*    (2006.01)
*G06F 12/00*    (2006.01)
*G06F 13/00*    (2006.01)

(52) U.S. Cl. ........................ 711/161; 711/162
(58) Field of Classification Search ................ 711/111, 711/112, 114, 161, 162
See application file for complete search history.

(56) References Cited

U.S. PATENT DOCUMENTS

| | | | | |
|---|---|---|---|---|
| 5,771,344 | A * | 6/1998 | Chan et al. ..................... 714/7 |
| 6,144,999 | A * | 11/2000 | Khalidi et al. ............... 709/219 |
| 6,148,383 | A * | 11/2000 | Micka et al. ................ 711/162 |
| 6,282,610 | B1 * | 8/2001 | Bergsten ..................... 711/114 |
| 6,301,677 | B1 * | 10/2001 | Squibb ......................... 714/13 |
| 6,647,474 | B2 * | 11/2003 | Yanai et al. ................. 711/162 |
| 6,996,691 | B2 * | 2/2006 | Sicola et al. ................ 711/162 |
| 7,065,589 | B2 * | 6/2006 | Yamagami .................. 709/246 |
| 2003/0051111 | A1 * | 3/2003 | Nakano et al. .............. 711/162 |
| 2003/0126107 | A1 * | 7/2003 | Yamagami ...................... 707/1 |
| 2003/0177321 | A1 * | 9/2003 | Watanabe .................... 711/161 |
| 2003/0233498 | A1 * | 12/2003 | Ogasawara et al. ........... 710/36 |
| 2004/0260902 | A1 * | 12/2004 | Stanley et al. ............... 711/165 |
| 2005/0033827 | A1 | 2/2005 | Yamagami |
| 2005/0198455 | A1 | 9/2005 | Yagawa et al. |
| 2005/0229034 | A1 | 10/2005 | Fujibayashi |

OTHER PUBLICATIONS

Richard P. King et al., Management of a Remote Backup Copy for Disaster Recovery, Jun. 1991, ACM Press, vol. 16 Issue 2, pp. 338-368.*

* cited by examiner

*Primary Examiner*—Matt Kim
*Assistant Examiner*—Ralph A Verderamo, III
(74) *Attorney, Agent, or Firm*—Townsend and Townsend and Crew LLP

(57) ABSTRACT

A remote copy system includes a first storage system including a first storage controller and a first data volume. The first storage controller is configured to control data access requests to the first data volume. The first storage system is configured to store write data in the first data volume upon receiving a write request from a first host that is associated with the first storage system. A second storage system includes a second data volume and configured to receive first copy data sent from the first storage system and store the first copy data in the second data volume, the first copy data corresponding to the write data stored in the first data volume. A third storage system includes a second storage controller and a third data volume and configured to receive second copy data from the second storage system and store the second copy data to the third data volume, the second copy data corresponding to the first copy data, the third data volume mirroring the first data volume. A fourth storage system includes a fourth data volume and configured to receive third copy data sent from the third storage system and store the third copy data to the fourth data volume, the third copy data corresponding to the second copy data.

22 Claims, 26 Drawing Sheets

Master Attribute　　　　　　　　　　Restore Attribute

REMOTE COPY SYSTEM HAVING MULTIPLE DATA CENTERS

BACKGROUND OF THE INVENTION

The present invention relates to a storage system, more particularly to a storage system configured to perform a remote copy function.

Data is the underlying resources on which all computing processes are based. With the recent explosive growth of the Internet and e-business, the demand on data storage systems has increased tremendously. Generally, storage networking encompasses two applications or configurations: network-attached storage (NAS) or storage area network (SAN). A NAS uses IP over Ethernet to transports data in file formats between storage servers and their clients. In NAS, an integrated storage system, such as a disk array or tape device, connects directly to a messaging network through a local area network (LAN) interface, such as Ethernet, using messaging communications protocols like TCP/IP. The storage system functions as a server in a client-server system.

Generally, a SAN is a dedicated high performance network to move data between heterogeneous servers and storage resources. Unlike NAS, a separate, dedicated network is provided to avoid any traffic conflicts between client and servers on the traditional messaging network. A SAN permits establishment of direct connections between storage resources and processors or servers. A SAN can be shared between servers or dedicated to a particular server. It can be concentrated in a single locality or extended over geographical distances. SAN interfaces can be various different protocols, such as Fibre Channel (FC), Enterprise Systems Connection (ESCON), Small Computer Systems Interface (SCSI), Serial Storage Architecture (SSA), High Performance Parallel Interface (HIPPI), or other protocols as they emerge in the future. For example, the Internet Engineering Task Force (IETF) is developing a new protocol or standard iSCSI that would enable block storage over TCP/IP, while some companies are working to offload the iSCSI-TCP/IP protocol stack from the host processor to make iSCSI a dominant standard for SANs.

Regardless of the type of storage system used, the data storage system users are acutely interested in maintaining back-up data in order to prevent loss of valuable data from failure in storage unit (or storage subsystem). Accordingly, the data storage systems generally includes back-up units to store data for emergency recovery when the primary units experience failure. The failure, however, may result from occurrence of natural disasters, e.g., earth quake or storm, in the area where the storage unit is provided, as well as from the break-down of the unit itself. If the back-up units are placed nearby the primary units, both of them may be destroyed when the natural disaster strikes. Accordingly, many storage system users prefer to place the primary units and the back-up units separated over along distance, e.g., over 100 miles apart. In fact, some users have even placed the primary and back-up units in different continents.

Currently, two operational modes are used by storage systems to copy the data to the back-up or secondary sites: synchronous mode and asynchronous mode. In synchronous mode, a write request from a host to the target storage volumes (e.g., in the primary storage system) completes only after write data are copied to the backup storage volumes (e.g., in the secondary or intermediate storage system) and acknowledge thereof has been made. The backup storage volumes may be secondary storage volume (SVOLs) or journal volumes (JNL).

Synchronous method guarantees no loss of data at the secondary system since the write data from the host is stored in the cache of the primary system until the acknowledgement has be received from the secondary or intermediary system. In addition, the primary volumes (PVOLs) in the primary storage system and the secondary volumes (SVOLs) in the secondary storage system are identically maintained, so that the SVOLs can be used promptly to replace the PVOLs if the PVOLs experiences failure. However, the primary and secondary storage systems cannot be placed too far apart, e.g., over 100 miles, under this mode. Otherwise, the storage system cannot efficiently execute write requests from the host, as explained in U.S. patent application Ser. No. 10/602,223, filed on Jun. 23, 2003, which is assigned to the assignee of the present application. U.S. patent application Ser. No. 10/602,223 is incorporated by reference for all purposes.

In asynchronous mode, a write request from a host to the primary storage system completes upon storing write data only to the primary system. The write data is then copied to the secondary or intermediary storage system as an independent step from the data write to the primary storage system. Accordingly, the primary and secondary systems may be placed far apart from each other, e.g., 100 miles or greater, without affecting the IOs processing efficiency at the primary system. However, data being transferred on the network may be lost if the primary system goes down since the PVOL and SVOL are not maintained identically. Accordingly, it would be desirable to provide a data storage system or remote copy system that provides the benefits of the synchronous and asynchronous modes, i.e., enables the primary and secondary systems to be placed far apart while guaranteeing no data loss.

BRIEF SUMMARY OF THE INVENTION

The present invention relates to a remote copy system having a plurality of data centers. In one embodiment, the remote copy system has four data centers. In another embodiment, the remote copy system has two data centers (i.e., primary site and secondary site), each with two independently operating storage systems.

In a remote copy system having four data centers, sites A, B, C and D, each site includes one more storage systems and operates the following remote copy operation in a forward replication operation:

(1) Each IO stored in PVOLs on a first storage system at site A are synchronously taken into a journal volume (JNL) 2031 on a second storage system at site B as a journal.

(2) The journal stored at site B is asynchronously transferred to a JNL 2053 on a third storage system at site C, which is then applied to SVOLs therein.

(3) The journal applied to SVOLs at site C is synchronously transferred to a JNL 61 on a fourth storage system at site D.

When an outage occurs at site A, the remote copy system operates the following failover operation:

(1) Suspend the forward replication or remote copy operation: (a) Site B realizes outage at site A and suspends taking journal process. The last record in JNL 31 is marked (JSUS) and propagated to other JNLs 2053, 2061, and 2023; (b) the transferring journal process between the second and third storage system is suspended after all journal data are transferred; (c) applying journal process is suspended on the third storage system after all journal data are applied to SVOL; (d) the taking journal process is suspended between the third and fourth storage systems after all journal data are transferred.

(2) After all journal data are applied to SVOL and all suspending processes have done, commence production process at site c using the third storage system: (a) Host 2040 starts IO to SVOL 2051; (b) each IO is synchronously taken into JNL 2061

(3) When the system at Site A is ready, commence the reverse replication or remote copy operation: (a) site A realizes that site C has been converted to a production site, and prepares JNL 2023 in the first storage system, and establish links between JNL 2023 and PVOLs. Links are reestablished between first and second storage systems; (b) JNL pointer that needs to be transferred from JNL 2061 to JNL 2023 is determined based on the JSUS mark; (c) transferring a journal process between JNL 2061 and JNL 2023, applying the a journal process to PVOLs, and synchronously taking a journal process into JNL 2031 are started.

In one embodiment, a remote copy system includes a first storage system including a first storage controller and a first data volume, the first storage controller being configured to control data access requests to the first data volume, the first storage system being configured to store write data in the first data volume upon receiving a write request from a first host that is associated with the first storage system and to send synchronously first copy data of the write data to a second storage; the second storage system including a second data volume and configured to receive the first copy data sent from the first storage system and store the first copy data in the second data volume, the first copy data corresponding to the write data stored in the first data volume; a third storage system including a second storage controller and a third data volume and configured to receive or pull second copy data from the second storage system, store the second copy data to the third data volume and synchronously send third copy data of the second copy data to a fourth storage system, the second copy data corresponding to the first copy data, the third data volume mirroring the first data volume; and the fourth storage system including a fourth data volume and configured to receive the third copy data sent from the third storage system and store the third copy data to the fourth data volume, the third copy data corresponding to the second copy data.

In one embodiment, a method for operating a remote copy system having first, second, third, and fourth storage systems includes at the third storage system, receiving or pulling a first copy request generated by the second storage system, the first copy request being associated with first copy data from the first storage system to the second storage system, the first copy data corresponding to write data stored in a primary volume in the first storage system; storing the first copy data to a secondary volume in the third storage system, the secondary volume being configured to mirror the primary volume; and transmitting a second copy request to the fourth storage system synchronously, the second copy request associated with second copy data that correspond to the first copy data.

In another embodiment, a computer readable medium includes a computer program for operating a remote copy system having first, second, third, and fourth storage systems. The computer program comprises code for receiving or pulling a first copy request at the third storage system, the first copy request generated by the second storage system, the first copy request being associated with first copy data from the first storage system to the second storage system, the first copy data corresponding to write data stored in a primary volume in the first storage system; code for storing the first copy data to a secondary volume in the third storage system, the secondary volume being configured to mirror the primary volume; and code for transmitting a second copy request to the fourth storage system synchronously, the second copy request associated with second copy data that correspond to the first copy data.

Yet another embodiment relates to a storage system provided in a remote copy system, wherein the remote copy system including the storage system and first, second, and third remote storage systems. The storage system comprises a storage unit including a plurality of storage disks that define a plurality of storage volumes; a storage controller to control access to the storage unit; a communication interface coupled to a network; and a computer readable medium including a computer program for operating the storage system. The computer program includes code for receiving or pulling a first copy request from the second remote storage system, the first copy request being associated with first copy data from the first storage system to the second storage system, the first copy data corresponding to write data stored in a primary volume in the first remote storage system; code for storing the first copy data to one of the plurality of storage volumes defined in the storage unit of the storage system, the one volume being a secondary volume and being configured to mirror the primary volume; and code for transmitting a second copy request to the third remote storage system synchronously, the second copy request associated with second copy data that correspond to the first copy data.

DETAILED DESCRIPTION OF THE INVENTION

I. Three Data Center Remote Copy System

Figure 1A:
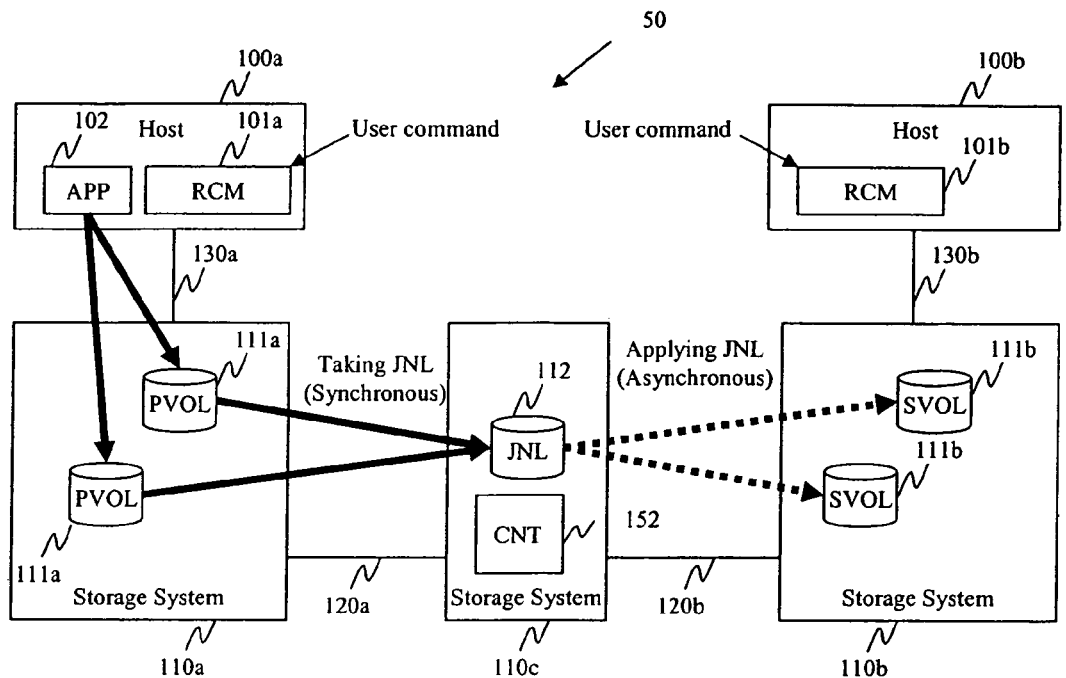
FIG. 1A illustrates a remote copy system having three data centers according to one embodiment of the present invention.

FIG. 1A illustrates a remote copy system 50 includes a plurality of storage systems according to one embodiment of the present invention. The remote copy system includes a primary storage system 110a, secondary storage system 110b and an intermediatary storage system 110c. The storage systems are coupled to each other via communication links 120a and 120b. In one embodiment, the link 120a is a Fibre Channel, and the link 120b is a public communication link since the former is considerably shorter than the latter, as explained below. The storage systems 110a, 110b, and 110c are disk array units or storage subsystems in the present embodiment.

Figure 1B:
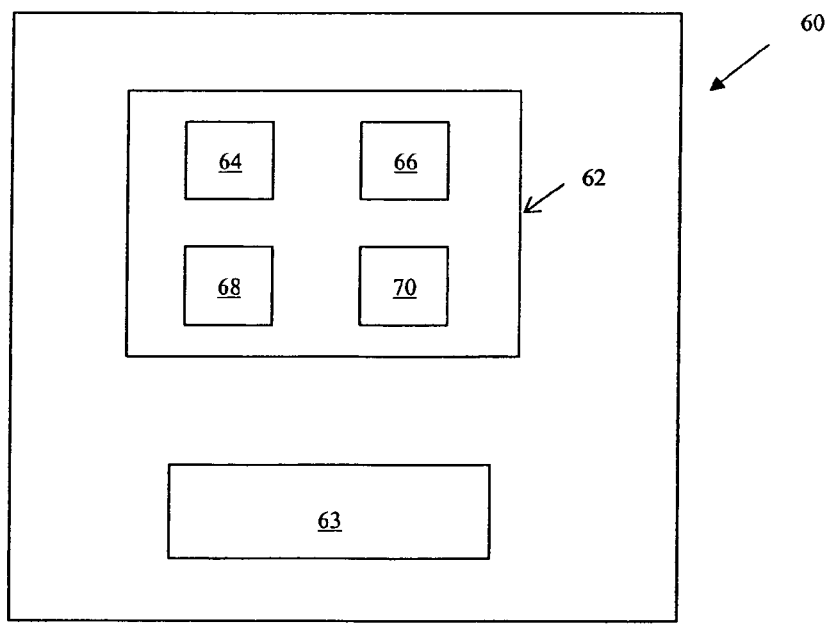
FIG. 1B illustrates an exemplary storage subsystem according to one embodiment of the present invention.

FIG. 1B illustrates an exemplary storage subsystem 60 (e.g., primary system 110a) including a storage controller 62 configured to handle data read/write requests (or IOs) and a storage unit 63 including a recording medium for storing data in accordance with write requests. The controller 62 includes a host channel adapter 64 coupled to a host computer (e.g., host 100a), a subsystem channel adapter 66 coupled to another subsystem (e.g., storage system 110c or 110b), and a disk adapter 68 coupled to the storage unit 63 in the storage subsystem 2060. In the present embodiment, each of these adapters includes a port (not shown) to send/receive data and a microprocessor (not shown) to control the data transfers via the port.

The controller 62 also includes a cache memory 70 used to temporarily store data read from or to be written to the storage unit 63. In one implementation, the storage unit is a plurality of magnetic disk drives (not shown).

The subsystem provides a plurality of logical volumes as storage areas for the host computers. The host computers use the identifiers of these logical volumes to read data from or write data to the storage subsystem. The identifiers of the logical volumes are referred to as Logical Unit Number ("LUN"). The logical volume may be included in a single physical storage device or a plurality of storage devices. Similarly, a plurality of logical volumes may be associated with a single physical storage device.

Referring back to FIG. 1A, in the present embodiment, the write data is sent synchronously between the primary system 110a and intermediary 110c, and asynchronously between the intermediary system 110c and secondary system 110b. Accordingly, the intermediary system 110c is generally located relatively close to the primary system 110a when compared to its distance from the secondary system 110b. For example, the intermediary system is located about 5 miles or less, or 10 miles or less, or 20 miles or less from the primary system. In one embodiment, the intermediary system is no more than 100 miles apart from the primary system. In comparison, the intermediary system is located about 50 miles or more, or 100 miles or more, 200 miles or more, or in a different continent from the secondary system according to one embodiment of the present invention.

The remote copy system includes a primary host 100a coupled to the primary storage system 110a via a communication link 130a, and a secondary host 100b couple to the secondary storage system 110b via a communication link 130b. The primary host includes an application program (APP) 102 to access (read and write) storage areas or volumes in the primary storage system 110a. In one embodiment, the APP 102 is operable to failover to the secondary host 100b if the primary host 100a or/and primary storage system 110a becomes unavailable (e.g., experiences failure) in order to provide uninterrupted access to data to users, particularly enterprise businesses. A remote copy management software (RCM) 101 runs on both of the hosts 100a and 100b to provide user and/or application interface for controlling the remote copy system.

The system 50 includes three types of volumes. The primary storage system includes one or more primary volumes (PVOLs) 111a. PVOLs 111a include production data that APP 101 reads and writes. The secondary storage system includes one or more secondary volumes (SVOLs) 111b. SVOLs 111b include copy data of PVOL 111a. The intermediary storage system includes one or more journal volumes (JVOL or JNL) 112. JVOL 112 stores write data written to PVOLs 11a and corresponding control data thereof. A single instance of write data and control data thereof comprise a journal, as explained below.

Figure 2:
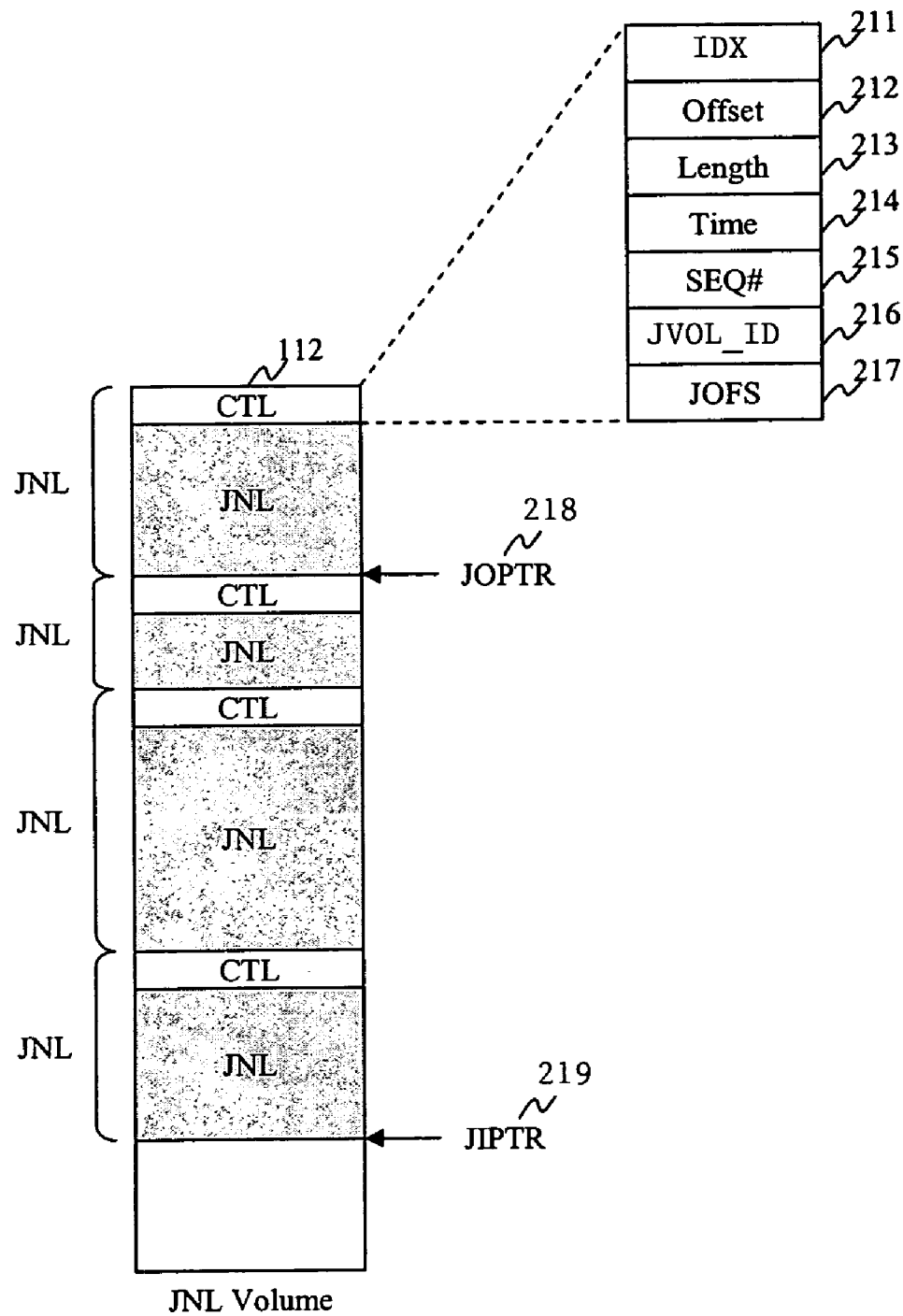
FIG. 2 illustrates a journal volume provided in an intermediary storage system according to one embodiment of the present invention.

FIG. 2 illustrates an exemplary JNL volume or JVOL 112 according to one embodiment of the present invention. JVOL is configured to store a journal or journal information used in performing a remote copy. The journal includes a pair of journal data and its control data. Journal data corresponds to the write data stored on PVOLs 111a. The write data may be an IO received from host 100 or a remote storage system. The control data contains administrative information relating to corresponding journal data.

In the present embodiment, the control data and journal data are both stored in the same journal volume in a sequential manner, i.e., the journals received are stacked onto one another in a FIFO memory. The intermediary storage system may include a plurality of such FIFO memories. In one embodiment, first control data is first stored in the volume 112, and first journal data corresponding thereto is stored in the same volume. Then a second control data is stored next to the first journal data, and second journal data corresponding to the second control data is stored next thereto, and so on.

Figure 4:
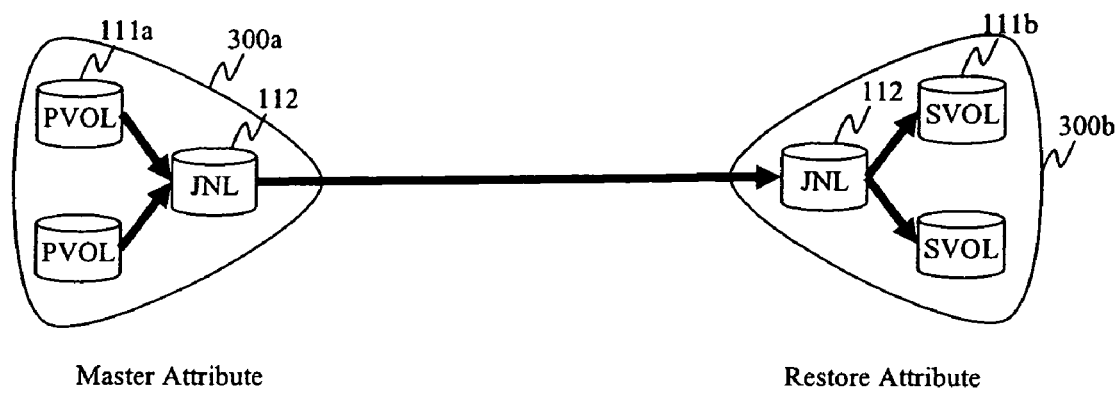
FIG. 4 illustrates journal groups having master and restore attributes according to one embodiment of the present invention.

The control data includes an index (IDX) 211 that is an identifier for PVOLs 111a from which journal data is derived, e.g., the unique number assigned for PVOL in the primary storage system 110a or in a journal group 200 (FIG. 4). An address 212 provides an offset address in the PVOLs, from which the write data is written, e.g., starting logical block address (LBA) of the write data. A length 213 provides the length of the write data, e.g., the number of logical blocks or total bytes of the write data. A time 214 indicates the time when a host writes data to PVOLs 111a. A sequence number (SEQ#) 215 provides the sequence information of the write data. That is, the sequence number provides write ordering within the primary storage system 110a. A JVOL identification (JVOL_ID) 216 identifies the journal volume that contains corresponding journal data, e.g., a unique number assigned to the journal volume in primary storage system or in the journal group 200. A journal offset (JOFS) 217 provides the offset address in the journal volume from which the journal data is stored or starting address of journal data. Alternatively, the control data may not include the JVOL_ID 216 and JOFS 217 since the control data is stored adjacent to the corresponding journal data.

The intermediary storage system 110c maintains two pointers a first pointer (JOPTR) 218 and a second pointer (JIPTR) 219. JOPTR 218 points to a journal that is to be sent to the remote storage system 110b. JIPTR 219 points to an address to where next journal received from the primary system is to be stored. Accordingly, JIPTR 219 should not get ahead of JOPTR 218 to prevent new journals from overwriting the journals that have not yet been sent to the remote storage system 110b.

As will be explained in connection with FIG. 8, the intermediary storage system 110c allocates a space on a journal volume. This space allocation is performed by adding the length of the control data and journal data to the JIPTR, i.e., Next JIPTR=JIPTR+(length of control data and journal data).

As described previously, when the intermediary storage system 110c receives a JNLWR command from the primary storage system 110a, it allocates a space on the JNL volume 112 along with a space on the cache memory in order to store the control data and journal data. When a journal is stored to the cache memory, the intermediary storage system 110c sends the completion of the JNLWR command. The journal is stored to the JNL volume 112' subsequently.

Figure 3:
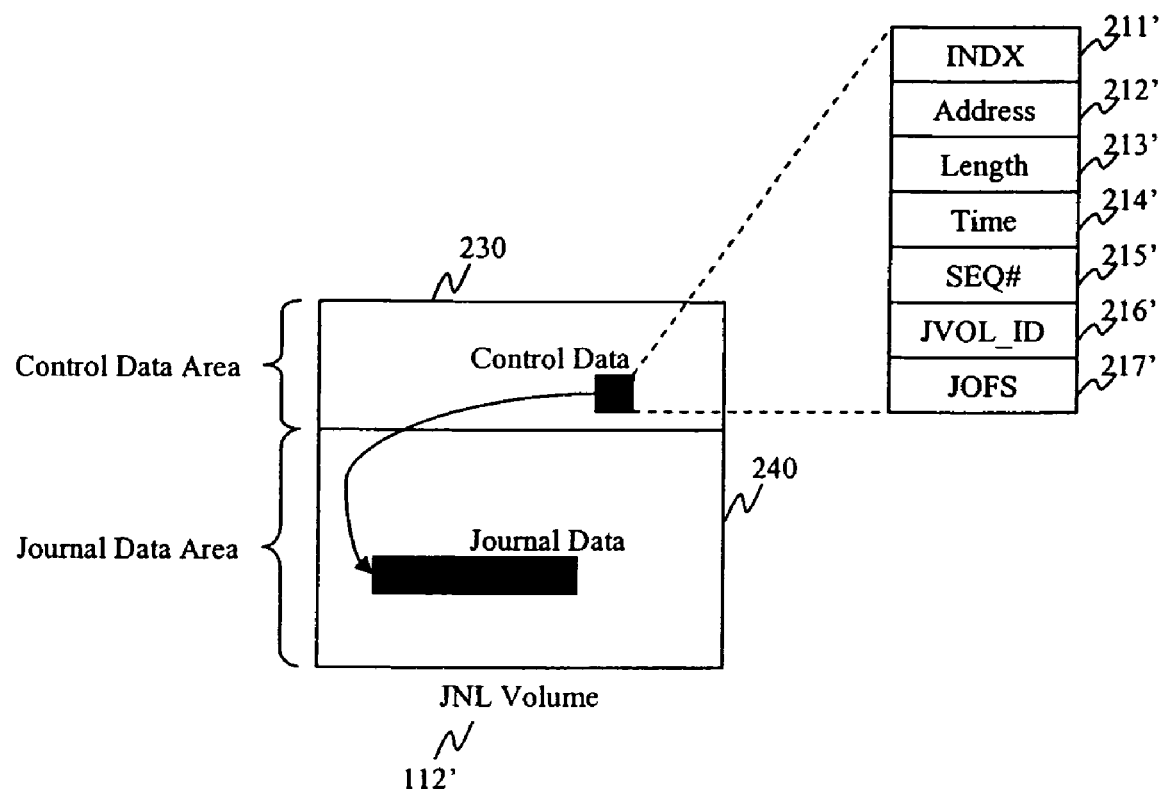
FIG. 3 illustrates a journal volume provided in an intermediary storage system according to another embodiment of the present invention.

FIG. 3 illustrates JNL volume or JVOL 112' according to another embodiment of the present invention. As explained above, the JVOL is configured to store a journal or journal information used in performing a remote copy operation. The journal includes a pair of journal data and its control data. The control data is stored in a control data area 230 of the JVOL 112', and the journal data is stored in a journal data area 240 of the JVOL 112'. In one embodiment, the JVOL is a first-in-first-out (FIFO) storage, so that the control data and journal data are read out according to its order of receipt.

In one implementation, the control data includes an index (IDX) 211' that is an identifier for PVOLs 111a from which journal data is derived, e.g., the unique number assigned for PVOLs in the primary storage system 110a or in a journal group 200 (FIG. 4). An address 212' provides an offset address in the PVOLs, from which the write data is written, e.g., starting logical block address (LBA) of the write data. A length 213' provides the length of the write data, e.g., the number of logical blocks or total bytes of the write data. A time 214' indicates the time when a host wrote the data to PVOLs 111a. A sequence number (SEQ#) 215' provides the sequence information of the write data. That is, the sequence number provides write ordering within the primary storage system 110a. A JVOL identification (JVOL_ID) 216' identifies the journal volume that contains corresponding journal data, e.g., a unique number assigned to the journal volume in primary storage system or in the journal group 200. A journal offset (JOFS) 217' provides the offset address in the journal volume from which the journal data is stored or starting address of journal data. The control data also includes JOFS 217' and JVOL_ID 216' since the control data and the journal data are stored in separate areas in the present embodiment.

There are two types of journals: update journal and base journal. The update journal is a journal for write data received from a host. A journal is generated and taken when a host writes data to PVOLs 111a. The base journal is a journal for preexisting data that have been residing on PVOLs 111a prior to pairing. The base journal is taken when a new copy of PVOL is created or resynchronization is necessary.

FIG. 3 illustrates a journal group according to one embodiment of the present invention. The journal group is a set of volumes (one or more volumes) for which journal is to be generated. A volume can be a member of only one journal group 300. Journal Group 300 includes one or more data volumes (or PVOLs or SVOLs) or one or more journal volumes.

Journal group 300 has attribute of either Master or Restore. A master journal group 300a generates journals while a restore journal group 300b restores journals to SVOLs 111b. That is, the journals are applied the SVOLs. The master journal group is associated with the primary storage system 110a and includes one or more PVOLs 111a, and optionally includes one or more journal volumes. The restore journal group is associated with the secondary storage system 110b and includes one or more SVOLs 111b, and optionally includes one or more journal volumes.

The journal group may also have an Intermediary attribute (not shown), e.g., the JVOL 112. In the present embodiment, the intermediary journal group has been grouped with the master journal group and the restore journal group. Such an intermediary journal group (not shown) is associated with the intermediary storage system 110c and includes one or more JVOLs, and optionally includes one or more SVOLs 111b.

Figure 5:
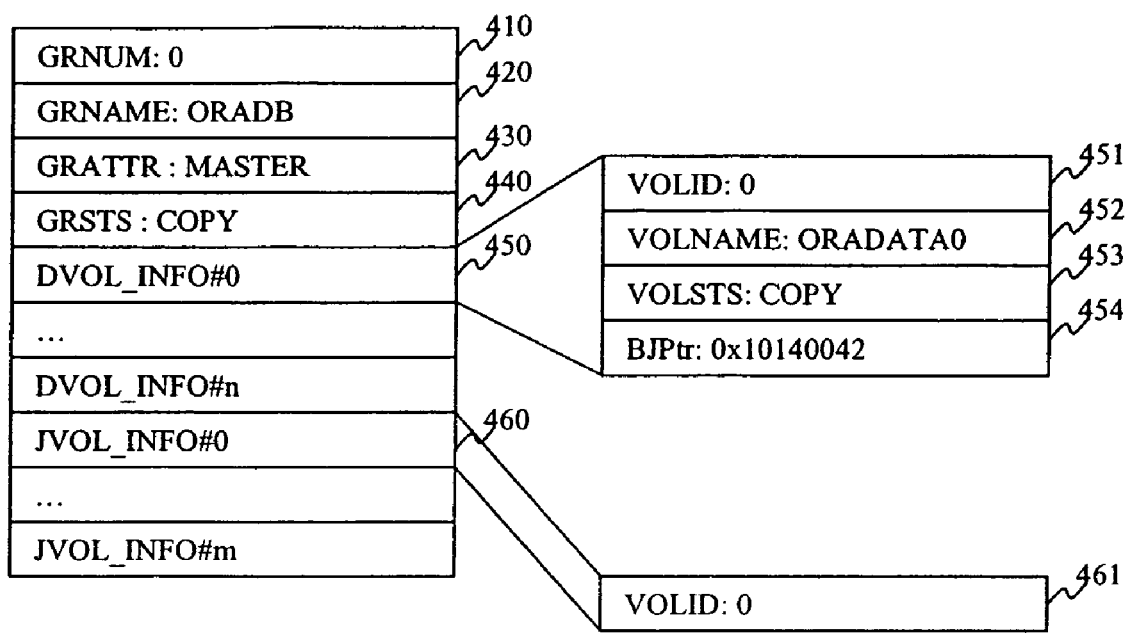
FIG. 5 illustrates a journal group table maintained by storage systems in the remote copy system of FIG. 1.

FIG. 5 illustrates a journal group (JNLG) table 400 according to one embodiment of the present invention. The storage system creates and maintains JNLG table 400 when its corresponding journal group is created. FIG. 4 shows the contents of JNLG table 400 maintained by the primary storage system 110a, secondary storage system 110b and intermediary storage system 110c.

A journal group number (GRNUM) 410 indicates a number uniquely assigned to the journal group within the storage system 110. A journal group name (GRNAME) 420 indicates the name assigned to the journal group, typically by a user. If two or more journal groups have the same GRNAME 420, then they have the remote mirroring relationship. A journal group attribute (GRATTR) 430 indicates the attribute assigned to the journal group, e.g., MASTER, INTERMEDIARY or RESTORE. As explained above, a master journal group generates journals from data volumes (PVOLs) in the journal group. An intermediary journal group is a transitional journal group between the master and restore journal groups. A restore journal group restores journal from journal volumes to data volumes (SVOLs).

A group status (GRSTS) 440 indicates the status of the journal group. The journal group may have the following status: COPY, PAIR, SUSP, and SMPL. The COPY status indicates that there is a data volume in the journal group from which base journal is taken. That is, the data stored in the PVOLs prior to the pairing (i.e., preexisting data stored in the base journal) has been retrieved for copying to the SVOLs. The PAIR status indicates that all preexisting data have been copied to the SVOLs and the journal group is or has retrieved updated data from the update journal for copying to the SVOLs. The SUSP or SUSPEND status indicates that the journal group has suspended taking or retrieving updated data from the update journal. The SMPL status indicates that no volume in the journal group has started taking the preexisting data from the base journal, i.e., the remote copy is to begin.

An array (DVOL_INFO) 450 stores information about all data volumes in the journal group. Each entry of the array contains the following information: a volume identification (VOLID) 451 that is uniquely assigned to the volume in the storage systems 110 (VOLID 451 generally has an integer value); a volume name (VOLNAME) 452 assigned to the volume by a user; a volume status (VOLSTS) 453 indicating the status of the volume, e.g., COPY, PAIR, SUSP, SMPL, and others; and a pointer (BJPtr) 454 keeps track of the progress of taking the base journal. The data volume in a journal group is assigned a unique index in the group for indexing the DVOL_INFO 450.

An array (JVOL_INFO) 460 stores information relating to all journal volumes in the journal group. JVOL_INFO 460 includes VOLID 461, the identifier of a journal volume 112. The journal volume in a journal group is assigned a unique index in the group for indexing the JVOL_INFO 450 array.

Figure 6:
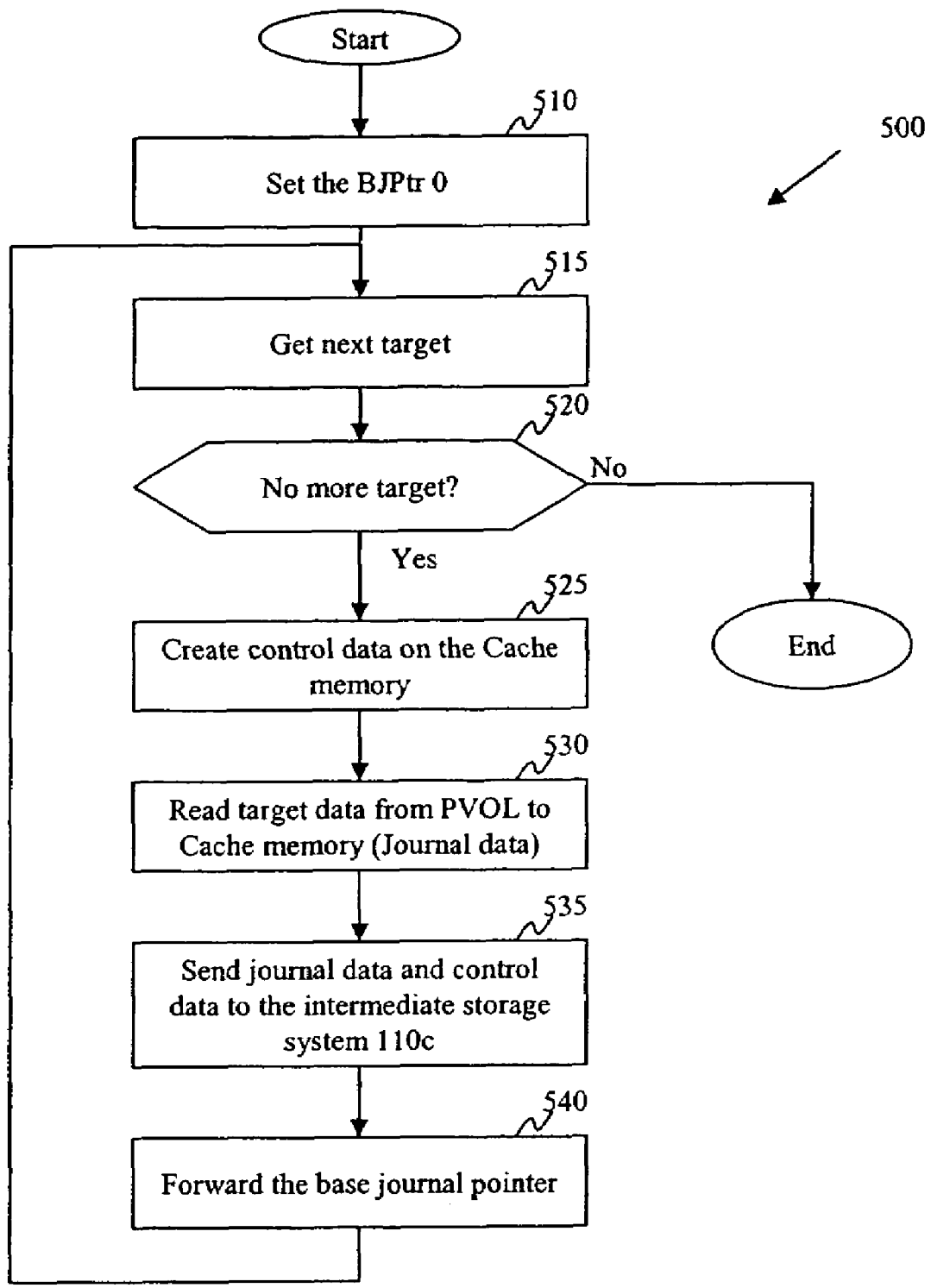
FIG. 6 shows a process for generating a base journal according to one embodiment of the present invention.

FIG. 6 illustrates a process 500 for generating a base journal according to one embodiment of the present invention. The process 500 is also referred to as an initial copy process. A base journal is taken when a user issues the PAIR_CREATE or PAIR_SYNC command. The PAIR_CREATE command causes a first volume in the primary storage system to be paired to a second volume in the secondary storage system. In the present embodiment, two data volumes are in the pair relationship if the following conditions are satisfied: (1) two JNL groups 300 maintained in the primary storage system 110a and the secondary storage system 110c have the same GRNAME420; (2) one of the two JNL groups 300 in the primary storage system 110a has the MASTER attribute in GRATTR430, and the other in the secondary storage system 110c has the RESTORE attribute; (3) two data volumes from the two JNL groups 300 have the same index number. The PAIR_SYNC command causes the paired volumes to be synchronized or mirrored, so that they both have identical data.

The primary storage system performs the process 500 upon receiving one of these two commands above. At step 510, a base journal pointer (BJPtr) 454 is initialized to start taking base journal from the first data (e.g. first block, track, chunk of blocks or any addressable data on the data volume) in the data volume. A next target it retrieved (step 515). The next target is obtained from the value of BJPtr 454. For example, the next target is j-th block if BJPtr 454 has j. In one embodiment, a journal is taken for several blocks of data at a time for more efficient processing. Accordingly, the next target after the j-th block is n blocks from the j-th block in the present example. The process determines whether there is additional target (step 520). The process 500 ends if no more target exists, i.e., all base journals have been taken.

However, if an additional target exists, a control data for the target blocks is created (step 525). The created control data is stored in a cache memory in the primary storage system 110a. The target data is read from PVOLs to the cache memory (step 530). After reading the target data, the control data is validated. The control data includes the following information: IDX 211, Address 212, and Length 213. Other information may be included as well.

The journal data and control data are sent to the intermediary storage system 110c (step 535). Generally, only journals (a pair of control data and journal data) that have been validated in step 530 are transmitted to the intermediary system. In one embodiment, a plurality of validated journals are sent together in a single command. BJPtr 454 is incremented to the next target after successfully transmitting the journals (step 540). That is, BJPtr 454 is incremented to be j+n. Steps 515 and 540 are repeated until no more target exists.

Figure 7:
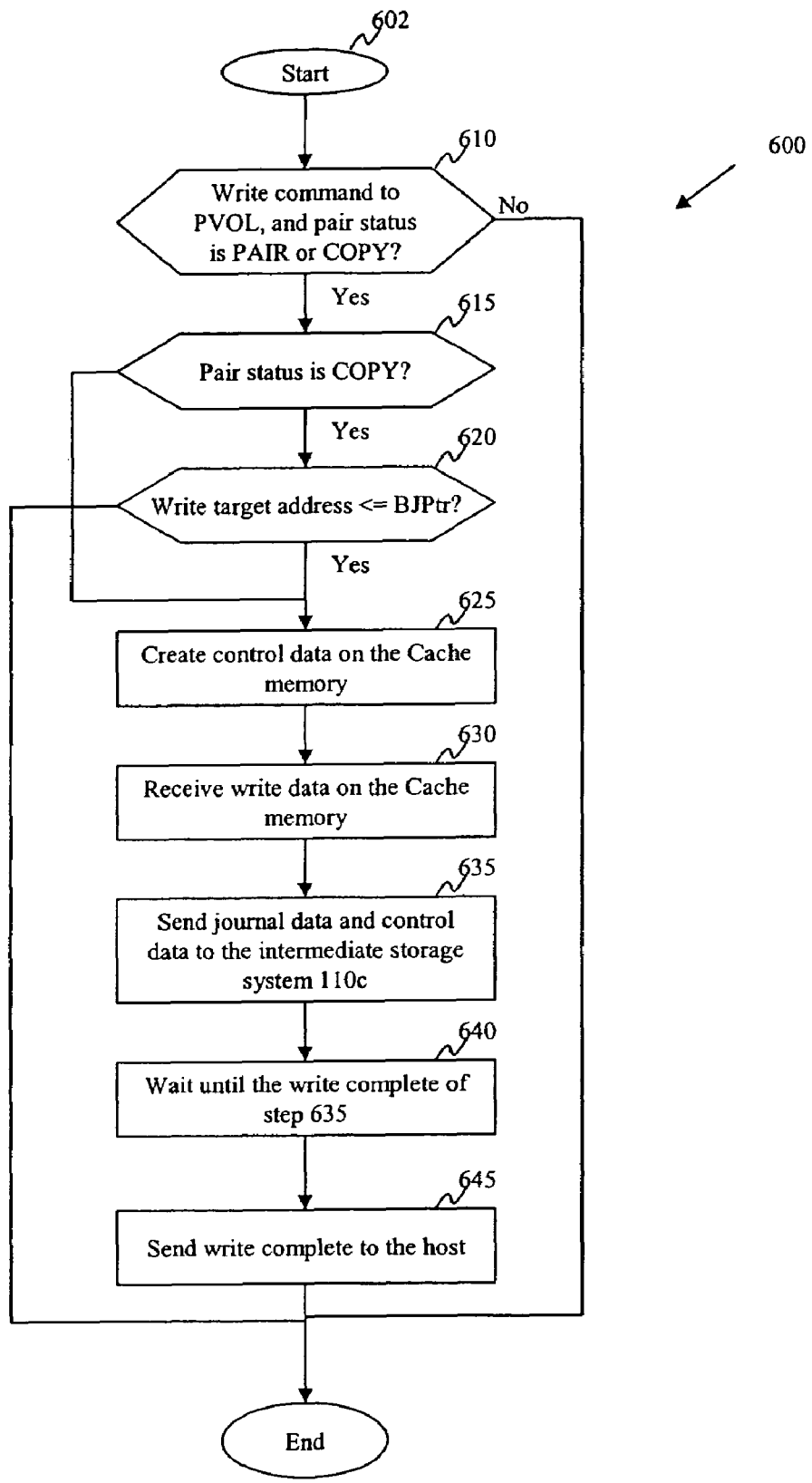
FIG. 7 shows a process for generating an update journal according to one embodiment of the present invention.

FIG. 7 illustrates a process 600 for generating update journal according to one embodiment of the present invention. The process 600 is also referred to as an update copy process. The process 600 commences after the PAIR_CREATE or PAIR_SYNC command is issued by a user (step 602). That is, the primary storage system starts taking update journal. Step 602 is performed after the process 500 if the PVOL has preexisting data.

The primary storage system 110a determines whether a write command has been received (step 610). All read commands are ignored at this time. The storage also determines if the pair status of PVOLs is COPY or PAIR. If the these conditions are satisfied, the primary storage system checks to determine whether or not the pair status is COPY (step 615). If so, it is checked to determine if base journal has already been taken for the write target address (step 620). This is done by examining the pointer BJPtr 454. That is, if (Write Target Address)<=BJPtr454, then the process 600 proceeds to step 625.

If step 620 is true or step 615 is false, i.e., the process of taking base journal has been completed, then update journal is taken for the write. For this purpose, the control date is first created. The control data includes IDX 211, address 212, and length 213. The write commands includes the address 212 and length 213. Other information may be included in the control data.

Write data is received from the host and stored in a cache memory (step 630). The write data corresponds to the journal date associated with the control data created at step 625. The control data and journal data are transmitted to the intermediary storage system 110c (step 635). The process 600 waits for an acknowledgement from the intermediary storage system 110c (step 640). The write completion is send to the host upon receiving the acknowledgement (step 645). The storage of the write data to the primary and intermediary systems are guaranteed since the write completion is not notified to the host until the acknowledgement from the intermediary system has been received.

Figure 8:
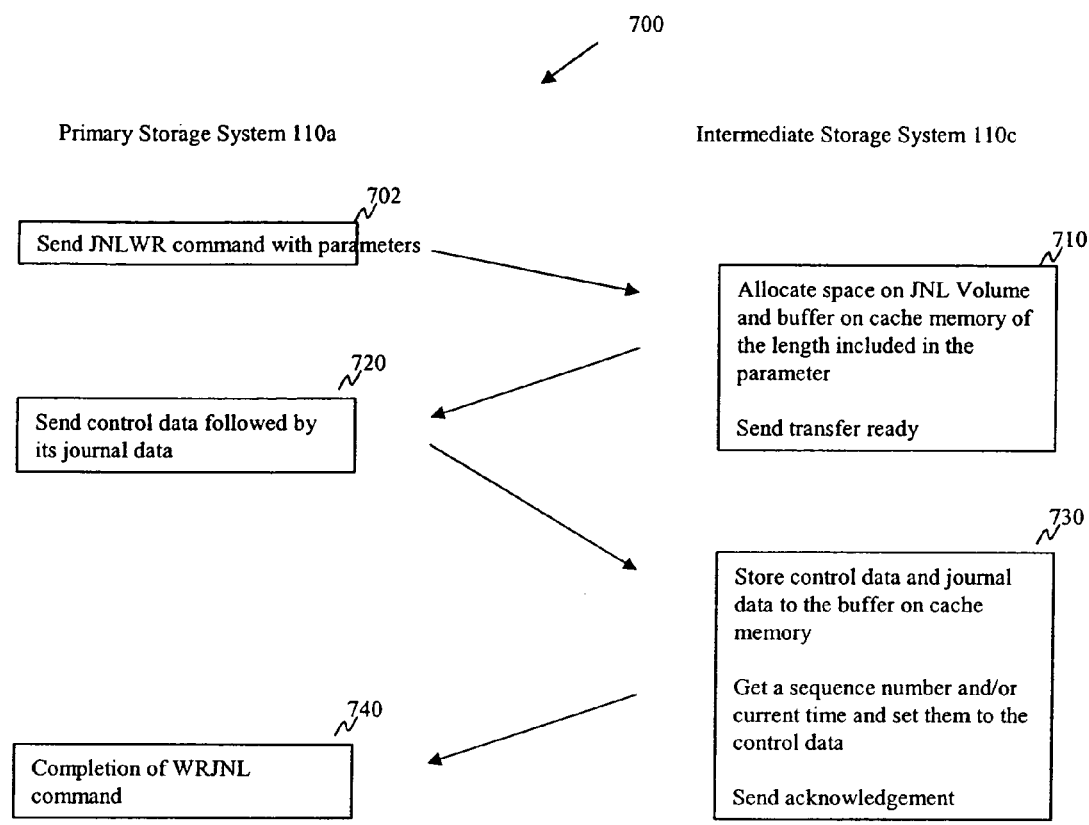
FIG. 8 shows a process for transferring a journal from a primary storage system to an intermediary storage system according to one embodiment of the present invention.

FIG. 8 illustrates a process 700 for transferring journal information including control data and journal data from the primary storage system 101a (or PVOLs) to the intermediary storage system 110c according to one embodiment of the present invention. The process 700 involves a taking journal process. The primary storage system 110a issues a JNL Write command (JNLWR command) to send journal data to the intermediary storage system 110c (step 702). In one embodiment, the command includes one or more parameters, e.g., the length of journal data. The length of control data is not included in the command parameter since a fixed data length, e.g., 64 byte, is used for the control data in the present embodiment. Alternatively, the control data of variable length may be used in which case information on its length would need to be included in the parameter.

The intermediary storage system 110c allocates a storage space on a JNL volume according to the information provided in the command parameter (step 710). The space allocation is also performed on a cache memory buffer to improve write performance, as explained in more detail later. The allocated buffer is associated with the allocated storage space in the volume. A transfer-ready packet or message is sent to the primary storage system 110a once the storage allocation has been performed.

The primary system transfers the journal information to the intermediary system upon receipt of the transfer-ready packet (step 720). In one embodiment, the control data is sent first and then the journal data.

The intermediary system stores the control data and journal data to the buffer on the cache memory (step 730). The journal is eventually stored in the allocated JNL volume in the intermediary system when the primary storage system 110b is idle according to the buffer-storage association performed at step 720. In addition, a sequence number and/or current timestamp are assigned to the journal, i.e., attached to the control data. The sequence number is sequentially assigned to journals received (from the primary system) and stored in the JNL volume. The sequence number provides the order of the journals received from the primary system, which is helpful in a data recovery process. In the present embodiment, the intermediary system 110c attaches the sequence number to the journals and otherwise manages the sequence number. A counter 152 is provided in the intermediary system to attach the sequence numbers to the journals transmitted by the primary system 110a (see, FIG. 1). A timestamp is also attached to the journals to indicate the time it was received by the intermediary storage system 110c. In another embodiment, the sequence information is attached to the journals at the primary system prior to transmitting them to the intermediary system. Similarly, the timestamp may also be attached to the journals by the primary system to indicate the time they were transmitted to the intermediary system. Once the journal has been properly received and stored, the intermediary system sends an acknowledge of the safe receipt of the journal to the primary system. Thereafter, the primary storage system 110a issues a completion of Write Journal command.

Figure 9:
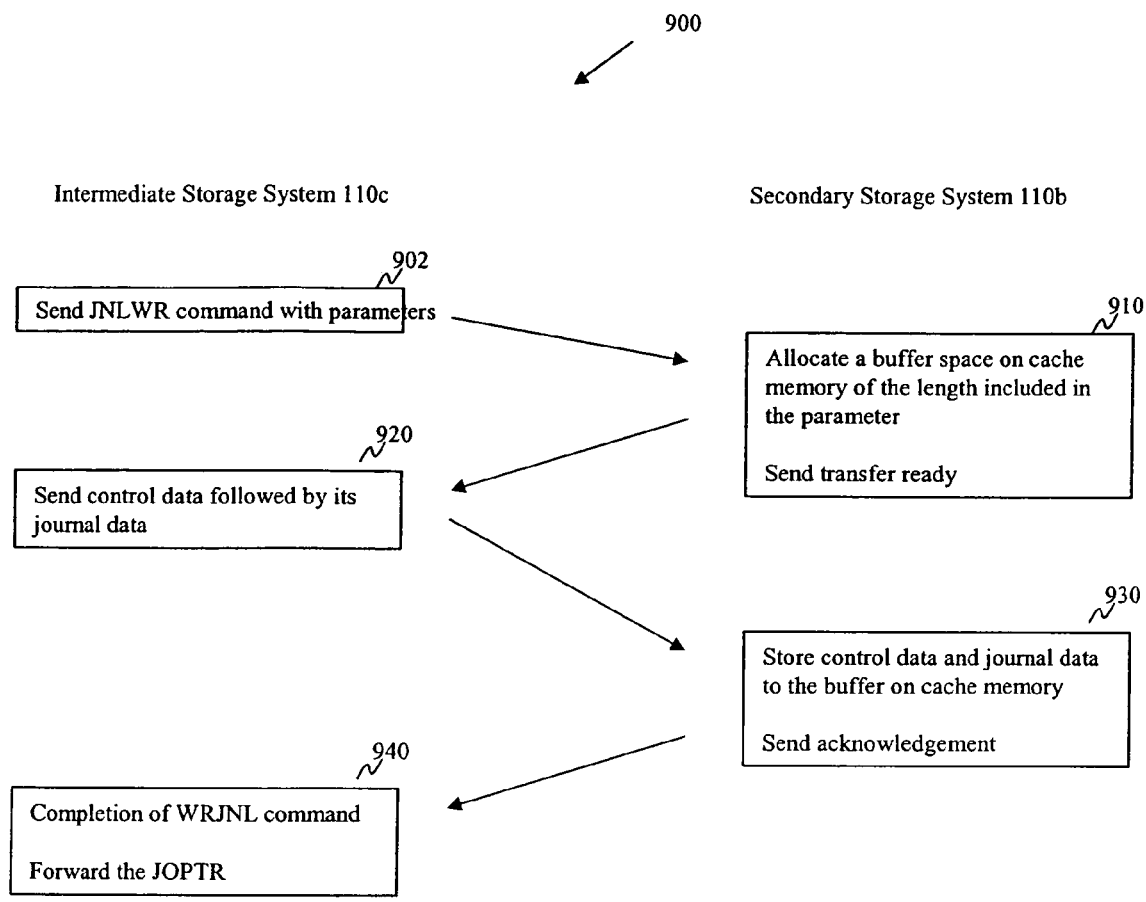
FIG. 9 illustrates a process for sending a journal from an intermediary storage system to a secondary storage system according to one embodiment of the present invention.

FIG. 9 illustrates a process 900 for sending journal from the intermediary storage system 110c to the secondary storage system 110b according to one embodiment of the present invention. In the present embodiment, journals stored in a JNL volume 112 of the intermediary storage system 110c are sent to the secondary storage system 110b asynchronously from the write commands of the primary storage system 110a, e.g., in between write commands from the primary system. In other implementations, the process 900 may be performed synchronously with the write command.

The process 900 is similar to the process 700 relating to the journal transfer from the primary system to the intermediary system. A JNL WR command with parameters is issued from the intermediary system to the secondary storage system (step 902). The secondary system allocates a buffer space on its cache memory according to the data length specified by the parameters and sends a transfer-ready notification back to the intermediary system (step 910). The intermediary system sends a journal including control data and its corresponding journal data (step 920). In one embodiment, the control data is first transmitted, followed by the journal data. The secondary system stores the journal to the allocated buffer space and sends an acknowledgement of the receipt of the journal to the intermediary system (step 930). The journal data is stored in a SVOLs based on the sequence number and timestamp assigned at step 730 of the process 700. For example, a journal having a lower sequence number is restored before that having a higher sequence number. Upon receipt of the acknowledgement, the intermediary issues a WRJNL command to indicate the completion of the write data (step 940). A pointer associated with the journal volume in the intermediary system, e.g., JOPTR, is moved forward to the next batch of data to be copied to the secondary system.

Figure 10:
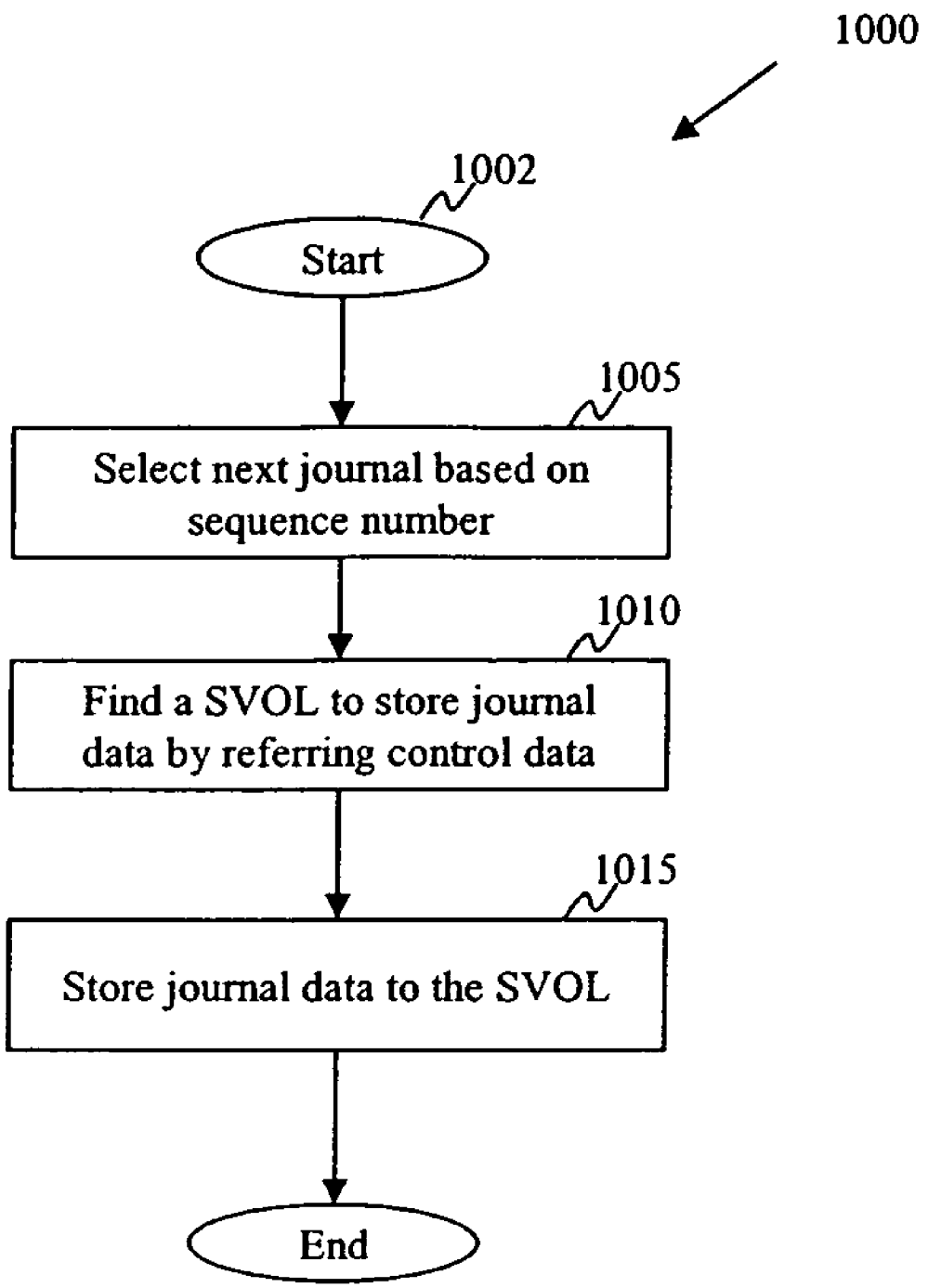
FIG. 10 illustrates a process for restoring journal in a secondary storage system according to one embodiment of the present invention.

FIG. 10 illustrates a process 1000 for storing journal data to a SVOL in the secondary storage system 110b using its corresponding control data according to one embodiment of the present invention. The secondary storage system 110b periodically invokes the process 1000 (step 1002) on JNL groups 300 with RESTORE attributes. In one embodiment, the process 1000 is invoked every ten seconds. A next journal including control data and journal data to be stored to the SVOL is selected using the sequence number (step 1005). For this purpose, the secondary storage system 110b keeps track of the sequence number of the journal that has restored, i.e., has its journal data stored to the SVOL. The secondary storage system determines the next journal to be restored by comparing the sequence number of the most recently restored journal with sequence numbers associated with the journals temporarily stored in the cache memory.

The control data of the journal selected at step 1005 is used to determine the storage area of the journal data, e.g., a particular SVOLs and a location therein (step 1010). For example, the following information in the control data are examined: IDX 211, Address 212 and LENGTH 213. The IDX 211 indicates an index for PVOL 111a in the MASTER JNL group, i.e., the primary storage volume in the primary system. The journal data is stored in a SVOL that has the same index (step 1015). That is, the journal data is stored in the SVOL specified by the IDX 211 at the address indicated by the Address 212 for the length corresponding to the LENGTH 213. In the present embodiment, the control data is not stored in the SVOL since the storage locations of the journal data in the PVOL and SVOL are mirrored.

II. Four Data Center Remote Copy System

As explained above, the three data center remote copy system provides excellent data protection by providing mirror image of the PVOLs at a secondary site (or also referred to as "recovery site") in the SVOLs during normal operations, i.e., during forward data replication. However, the above three data center system does not provide the same level data protection during the failover operation when the secondary or recovery site functions as the data production site. That is, it does not provide a reverse data replication with high data protection capabilities.

Figure 11:
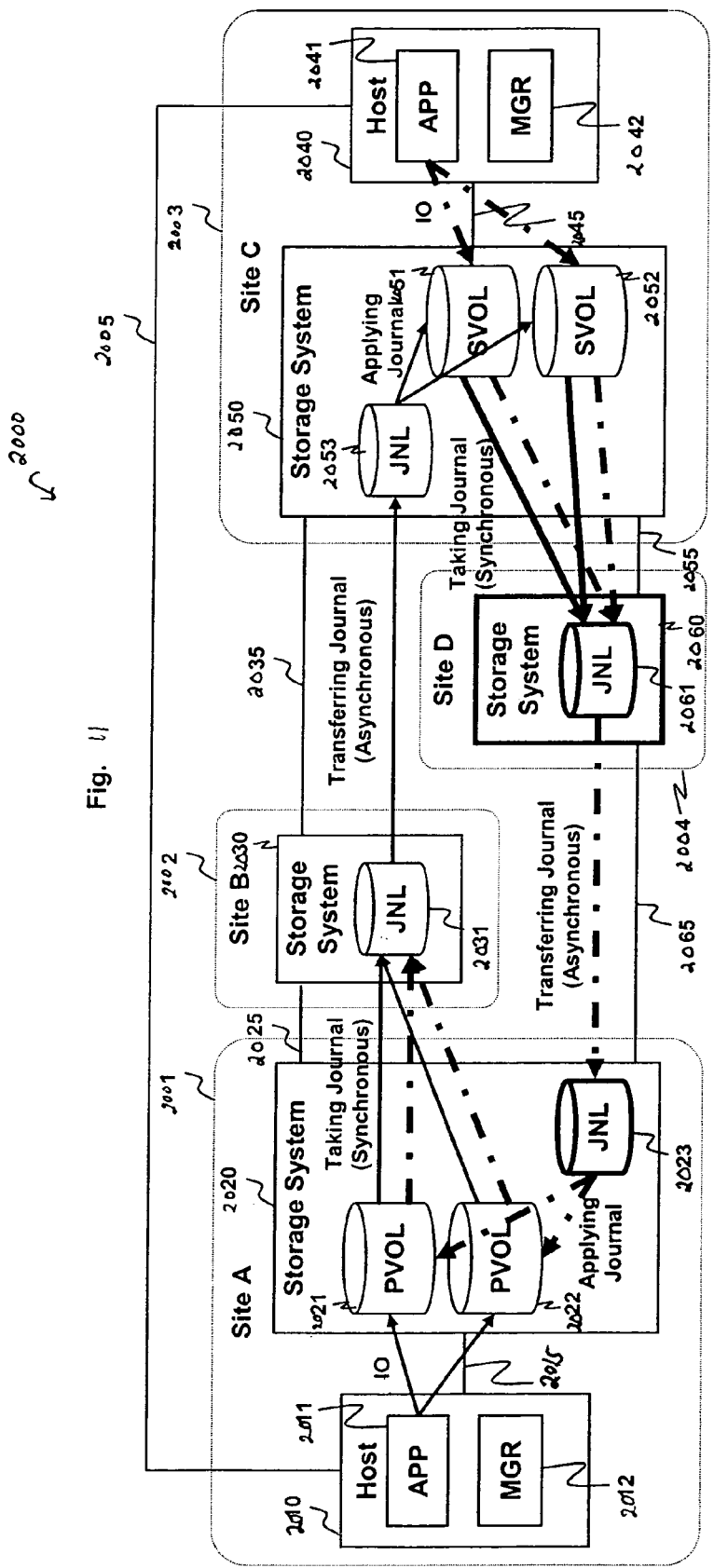
FIG. 11 shows a remote copy system having four data centers or sites according to one embodiment of the present invention.

FIG. 11 shows a remote copy system 2000 having four data centers or sites according to one embodiment of the present invention. The remote copy system includes a site A 2001, site B 2002, site C 2003 and site D 2004. Site A and site B are placed close enough to execute a synchronous remote copy operation without noticeably effecting the IOs processing at site A, i.e., with minimal effect on IO processing capabilities. On the other hand, sites B and C are placed sufficiently far enough to prevent both sites B and C from damaged at the same time due to regional disasters, e.g., earthquake, fire, and typhoon, and so on. Sites C and D are placed close enough to execute a synchronous remote copy operation with minimal impact on IO processing at site A. Sites D and A are placed sufficiently far apart to avoid both sites from being destroyed together by regional disasters. Solid and dashed arrow paths indicate forward and reverse replication flows, respectively, according to one embodiment of the present invention.

As used herein, the term "minimal impact" refers to an IO processing delay that users do not consider to be problematic. Accordingly, what is considered to be "minimal impact" may depend on the application run by the users. In FIG. 11 and others, the solid arrows represent a forward replication flow, and the dotted arrows represent a reverse replication flow, as will be explained below.

Site A 2001 is a primary site where primary application programs run. Site A 2001 includes a host 2010 and a storage system 2020, which are connected through a storage network 2015. Although only one host and one storage system is shown in FIG. 11, site A may have a plurality of hosts and storage systems.

The storage network 2015 is a SAN (Storage Area Network) in the present embodiment. The network 2015 may be based on FibreChannel, FICON, ESCON, iSCSI and so on. In another embodiment, the network 2015 is a NAS (Network Attached Storage) based on NFS, CIFS and so on.

Host 2010 includes Application Program (APP) 2011 and Management Program (MGR) 2012. Application Program 2011 generates IO requests that are transmitted to storage system 2020. There can be several application programs running on the host. Management Program 2012 manages the remote copy operation associated with storage system 2020.

Storage system 2020 includes a plurality of Primary Volumes (PVOLs) 2021 and 2022 and a Journal Volume (JNL) 2023. In one implementation, storage system 2020 is based on a RAID configuration. One example of such a storage system is Hitachi Lightning® series. The number of PVOLs and JNLs provided in storage system 2020 vary according to different implementations.

Site B is a first intermediate site, which serves as a bridge to site C, so that data replication may be conducted from site A to site C. Site B includes a storage system 2030, which is connected with storage system 2020 via a storage network 2025. Examples of the storage network 2025 are FibreChannel, FICON, ESCON, FCIP, iFCP, iSCSI and so on. Storage system 2030 includes a JNL 2031 that stores updates from host 2010 to PVOLs 2021 and 2022. PVOLs 2021 and 2022 may be in the same consistency group in one embodiment. JNL 2031 stores journals, each including journal data and control data that correspond to the update. Site B may or may not have a host depending on implementations. Generally, it does not need a host if it only serves as an intermediary site and does not functions as a recovery site.

Site C is a secondary or recovery site that performs recovery or backup operations when a planned or unplanned outage occurs at site A (or the primary site). In the present implementation, the logical configuration of site C is the same as in site A. Site C includes a host 2040, a storage system 2050, and a network 2045 coupling host 2040 and storage system 2050. Host 2040 includes Application Program (APP) 2041 and Management Program (MGR) 2042. Storage system 2050 includes a plurality of Secondary Volumes (SVOLs) 2051 and 2052 and a Journal Volume (JNL) 2053.

A communication link 2005 couples hosts 2010 and 2040, so that Heartbeat signals may be exchanged between host 2010 and host 2040. In implementation, the communication link or Heartbeat link is IP based.

Site D is a secondary intermediate site and includes a storage system 2060 including a JNL 2061. JNL 2061 stores journals from JNL 2053 or SVOLs 2051 and 2052 of storage system 2050. JNL 2061 is used during a reverse replication operation, as explained below. In the present embodiment, storage systems 2020, 2030, 2050, and 2060 have similar configuration as that of storage subsystem 60 of FIG. 1B. A network or link 2065 couples storage systems 2060 and 2020.

Figure 12:
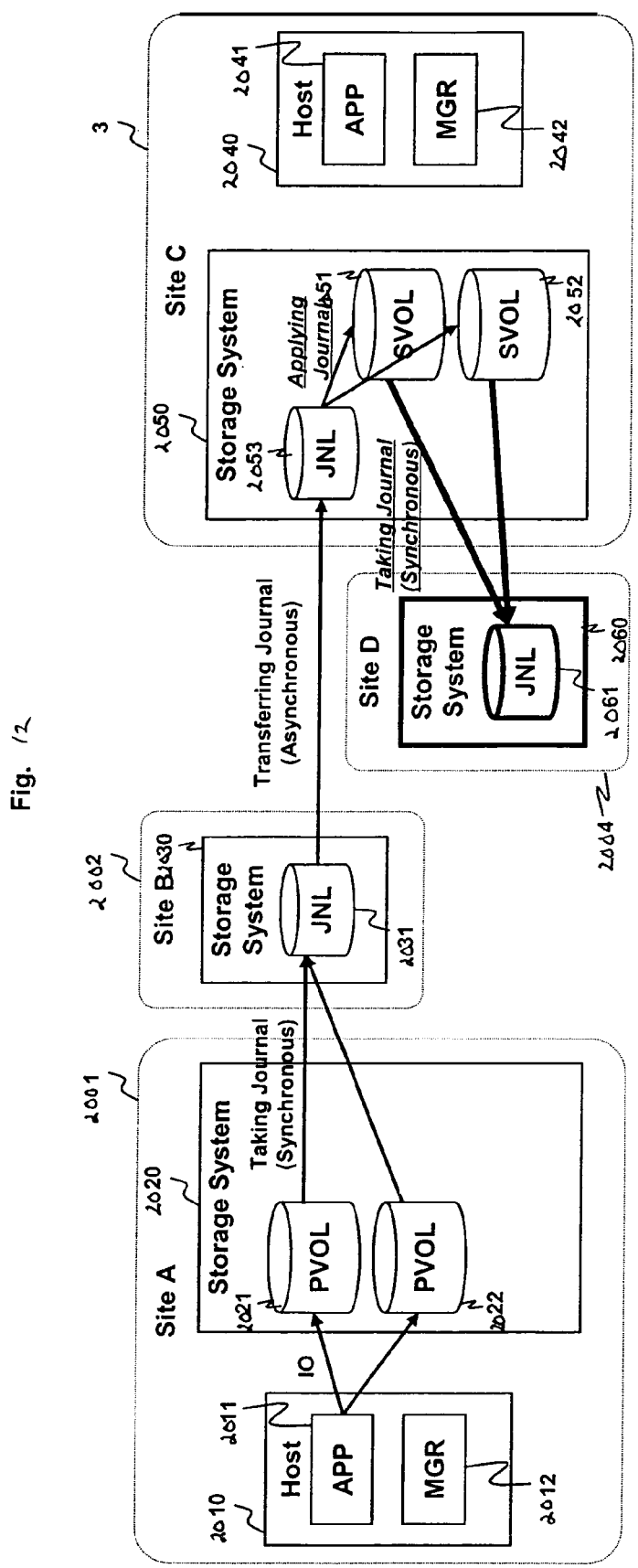
FIG. 12 illustrates a forward data replication process according to one embodiment of the present invention.

FIG. 12 illustrates a forward data replication process according to one embodiment of the present invention. In the present embodiment, the process is implemented as microcode programs in the storage systems.

(1) IO and Taking Journal Process

Host 2010 sends WRITE IOs to storage system 2020. The IOs refer to inputs or outputs, an example of which is a write request including write data. The IOs are replicated to storage system 2030 at site B as journals. Once replicated, the journals are sent to or taken by storage system 2030 and stored in JNL 2031. For illustrative convenience, a process of generating a journal using an IO stored in a PVOL/SVOL and storing the journal in a journal volume is referred to as a "taking journal process." Process 700 of FIG. 8 above illustrates one exemplary taking journal process. Other variations of the taking journal process may be used for the present embodiment.

These journals correspond to the IOs received by storage system 2030 and stored in PVOLs. A journal is generated or replicated for each IO. A journal includes journal data corresponding to write data and control data that provide administrative information on the journal data. The taking journal process and the IO write request process are performed synchronously in the present embodiment. Accordingly, sites A and B are provided relatively close to each other to minimize its impact on IO performance. Sites A and B may be in different buildings, in different floors of the same building, in different rooms of the same building, or the like. In fact, storage systems 20 and 30 may be in the same site, location, or equipment housing as long as they are operated as independent storage systems.

(2) Transferring Journal Process

Journals are transferred from storage system 2030 in site B to storage 2050 in site C. That is, the journals are moved from JNL 2031 to JNL 2053. This process, where a journal is moved from one journal volume to another journal volume, is referred to as a "transferring journal process." The transferring journal process is asynchronously executed with the IO write step (or the taking journal process), so that the transferring journal process does not impact the IO performance of the storage system 2020. As a result, site C can be located far away from site B.

(3) Applying Journal and Taking Journal Processes

In storage system 2050, the journals that are transferred to JNL 2053 are applied to SVOLs 2051 and 2052. That is, the journal data from the journals are stored in appropriate areas of SVOLs as write data, so that SVOLs 2051 and 2052 would mirror PVOLs 2021 and 2022. For illustrative convenience, this process of restoring journals stored in a journal volume as write data stored in a PVOL/SVOL is referred to as an "applying journal process." Process 1000 of FIG. 10 above illustrates one exemplary applying journal process. Other variations of the applying journal process may be used for the present embodiment.

The journals are also send to the to JNL 2061 of storage system 2060 in site D. This taking journal process is performed synchronously with the applying journal process above. Accordingly, sites C and D are provided in close proximity to each other to minimize the performance impact. As with sites A and B, sites C and D may be provided in different buildings, in different floors of the same building, or in different rooms of the same building. The sites may also be the same site as long as storage systems 2050 and 2060 operate as independent storage systems.

In another embodiment, the journals stored in JNL 2053 of storage system 2050 is transferred to JNL 2061 of storage system 2060 first and then the journals are applied to SVOLs 2051 and 2052. Alternatively, the journals are first applied to SVOLs and then transferred to JNL 2061.

Figure 13:
FIG. 13 illustrates a method of handling journals stored in a JNL at a recovery site according to one embodiment of the present invention.

FIG. 13 illustrates a method of handling journals stored in JNL 2053 at site C according to one embodiment of the present invention. The method uses the transferring and applying journal processes. This particular method is implemented by using microcode programs stored in storage systems 2050 and 2060.

At step 2101, a first program in storage system 2050 selects a journal in JNL 2053 to be processed based on a sequence number. The sequence number provides sequential order of journals to be processed and applied to SVOLs.

The following steps relate to a transferring journal process. At step 2102, the first program sends a JNL WR command including parameters to storage system 2060. A second program in storage system 2060 analyzes the command and parameters and determines that the command is a JNL WR command (step 2111). The second program of storage system 2060 allocates a storage area on JNL 2061 and buffer on cache memory. The capacity of the allocated storage area and buffer are based according to the data length provided in the parameter (step 2112). The second program then sends a "transfer ready" acknowledgement to storage system 2050 (step 2113).

At step 2103, the first program prepares control data and journal data of the journal selected at step 2101. The first program sends the control data and journal data to storage system 2060 (step 2104). The second program stores the control data and journal data received from storage system 2050 to the allocated buffer (step 2114).

At step 2115, the second program obtains a sequence number and current time and sets them to the control data and stores the control data and the journal data to JNL 2061. The second program sends acknowledgement to storage system 2050 (step 2116). Then the first program completes the JNL WR command (step 2105).

The following steps relate an applying journal process. At step 2106, the first program finds an appropriate SVOL to store the journal data by referring the control data. The first program stores journal data to the SVOL (step 2107), thereby recovering the write data corresponding to the journal data.

As a result, SVOLs 2051 and 2052 mirror PVOLs 2021 and 2022 and JNL 2061 mirrors JNL 2031. In another implementation, these results may be accomplished by performing an applying journal process involving JNL 2053 and SVOLs 2051 and 2052 and a taking journal process involving SVOLs and JNL 2061.

Figure 14:
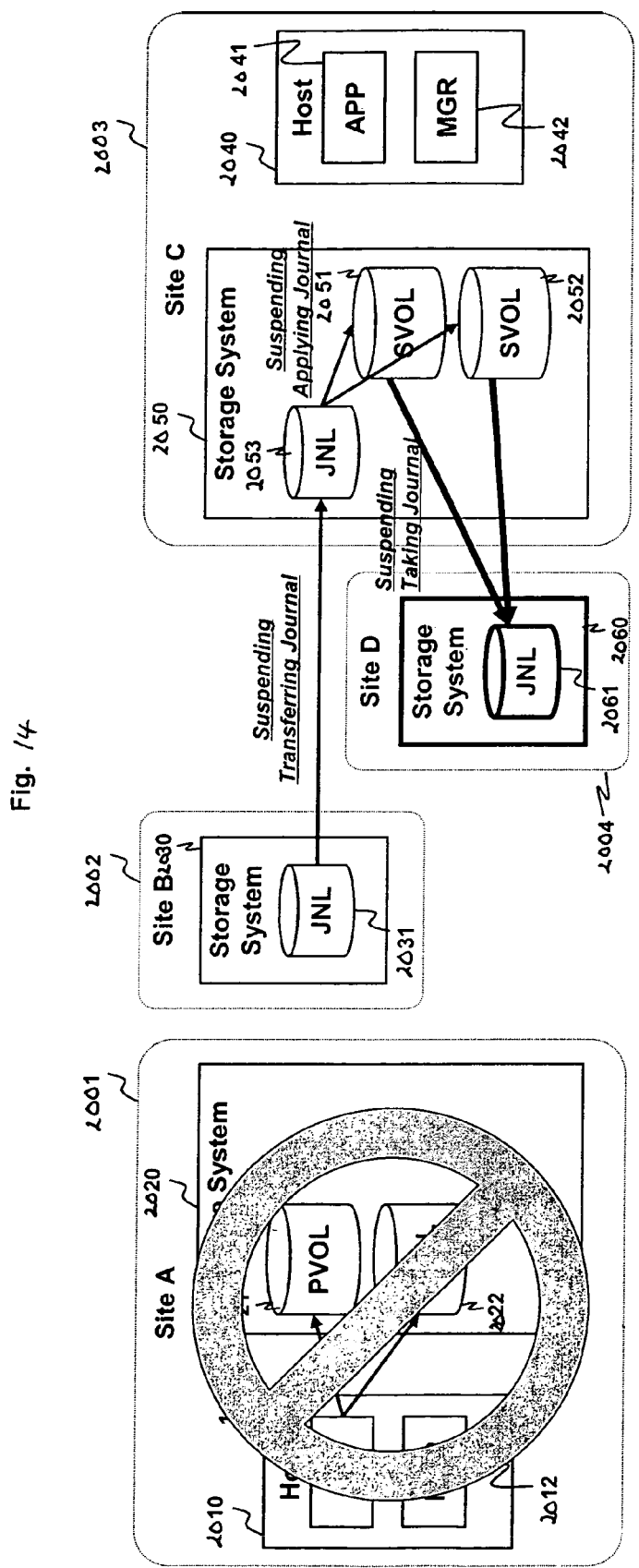
FIG. 14 illustrates a process of suspending the forward replication process according to one embodiment of the present invention.
Figure 18:
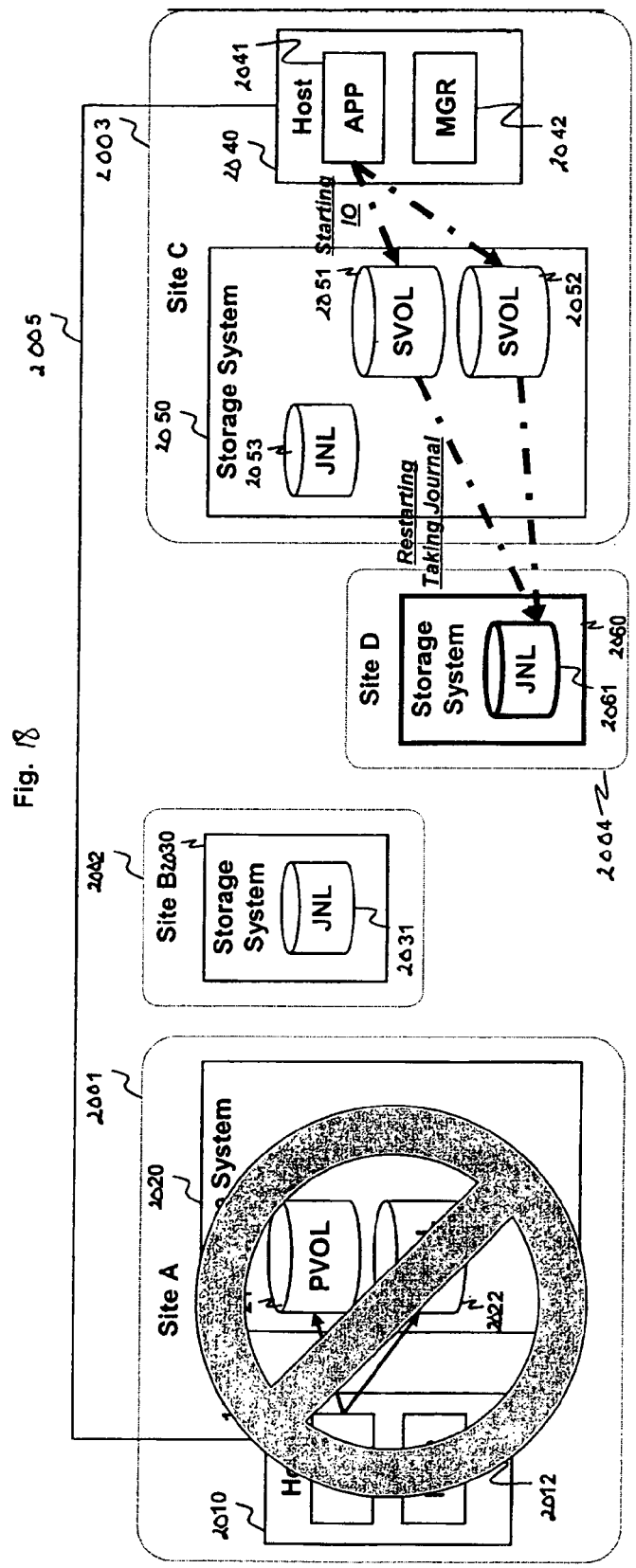
FIG. 18 illustrates converting site C as the production site in place of site A according to one embodiment of the present invention.
Figure 20:
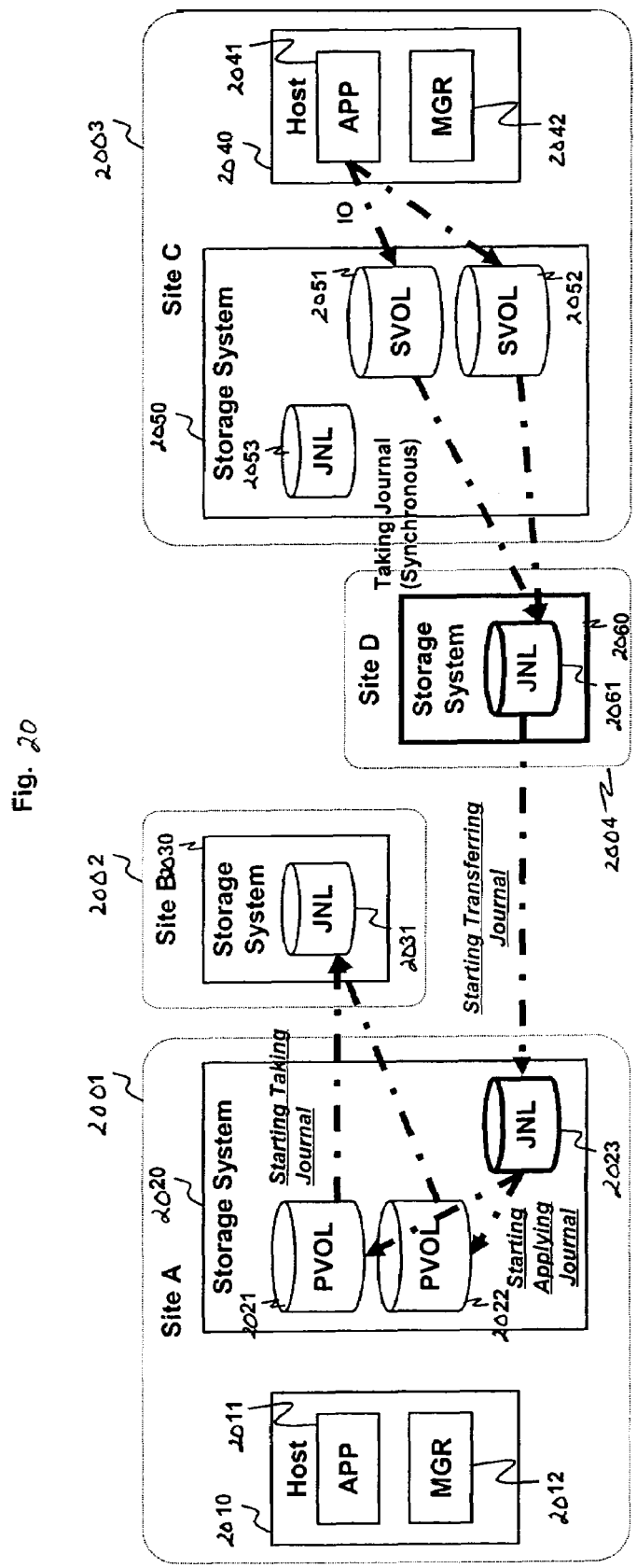
FIG. 20 illustrates a reverse replication processing according to one embodiment of the present invention.

FIGS. 14, 18, and 20 illustrate a failover operation according to one embodiment of the present invention. The failover operation is performed to convert a secondary site, i.e., site C, to a production site if a primary site, i.e., site A, is offline for either planned or unplanned outage. If the failover operation is performed, clients that had previously accessed site A switches their access to site C. The failover operation generally includes the following processes: 1) suspending forward replication process, 2) starting production process at site C, and 3) starting reverse replication process.

FIG. 14 illustrates a process of suspending the forward replication process according to one embodiment of the present invention. The forward replication process is suspended if it is determined that site A is experiencing failure or is receiving maintenance service. The suspending process involves suspending the transferring journal process between JNL 2031 and JNL 2053, suspending the applying journal process between JNL 2053 and SVOLs 2051 and 2052, and suspending the taking journal process between SVOLs 2051 and 2052 and JNL 2061. These suspending steps are implemented as microcode programs in storage systems 2030, 2050, and 2060.

The process of suspending the forward replication process involves suspending the transferring journal process between JNL 2031 at site B and JNL 2053 at site C. Storage system 2030 initiates this upon determining that site A is under outage. In case of a planned outage (or scheduled maintenance), storage system 2020 sends a SUSPEND command instead of a JNL WR command to storage system 2030.

Figure 15:
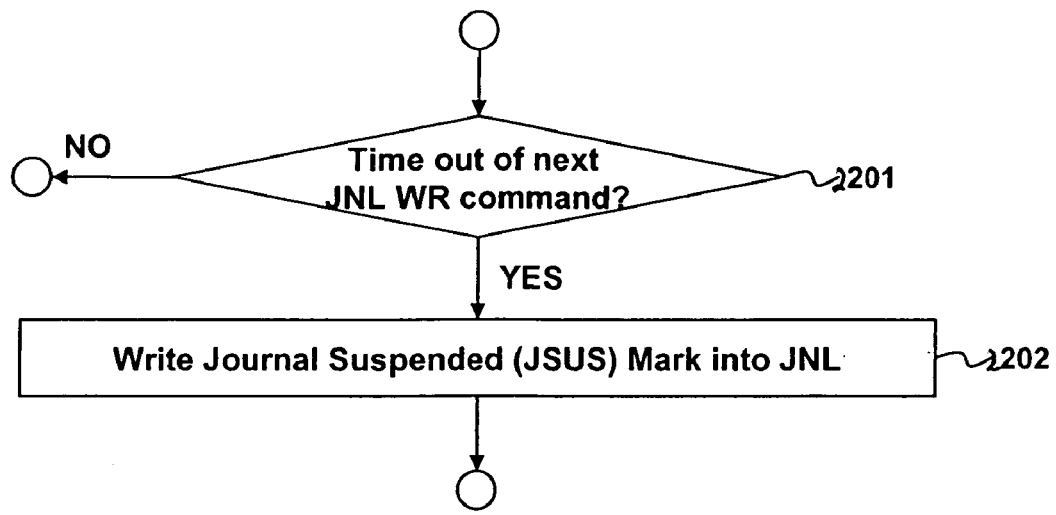
FIG. 15 illustrates an example of one such a routine performed by storage system 2030.

In case of an unplanned outage, storage system 2030 performs a routine to check the operational state of storage system 2020. FIG. 15 illustrates an example of one such a routine performed by storage system 2030. This routine preferably should be performed by storage system 2030 each time a journal is taken or received from PVOLs 2021 and 2022.

At step 2201, while waiting for next JNL WR command, a program provided in storage system 2030 counts the time period elapsed since the last journal was received from the PVOL or storage system 2020. If the next JNL WR command is not received within a given time period, then the program assume that site A is under outage (or timeout has occurred) and goes to step 2202. Otherwise, storage system 2030 continues the taking journal process. The given time period may be set by a user or set automatically based on IO workload at site A.

At step 2202, the program writes Journal Suspended (JSUS) mark into JNL 2031. The JSUS mark indicates the point at which the taking journal process has been suspended. This JSUS mark is propagated to other JNLs 2053, 2061 and 2023. When the JSUS mark is received and processed, each storage system realizes that site A is under outage and that a failover operation has commenced.

In another embodiment, the sequence number of the last journal that was processed is recorded in storage system 2030 and propagated to other storage systems 2050, 2060, and 2020 as well as information that failover operation has commenced. In the case of planned outage, the program executes step 2202 upon receiving a SUSPEND command from storage system 2020.

Figure 16:
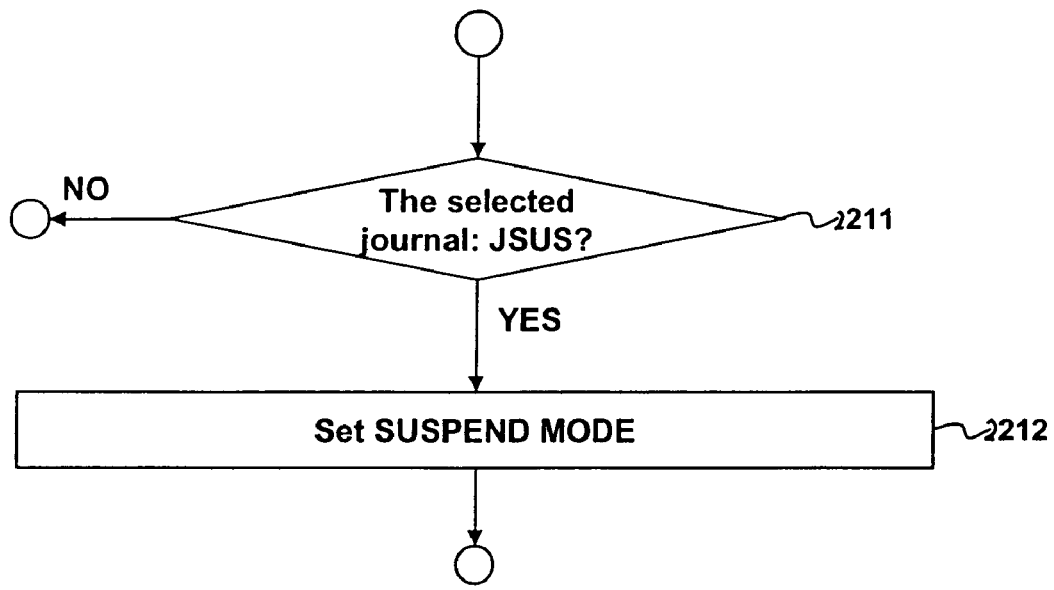
FIG. 16 illustrates a method for placing a journal volume in SUSPEND mode according t one embodiment of the present invention.

Referring to FIG. 16, storage system 2030 changes the mode of JNL 31 to SUSPEND, which indicates that the taking journal process from storage system has been suspended. This process is performed at the end of the transferring journal process by storage system 2030 in the present implementation. That is, the following steps are executed after the JSUS mark has been transferred to JNL 2053 at site C.

At step 2211, if the program determines that the selected journal is a JSUS mark, then the program executes step 2212 by setting JNL 2031 in a SUSPEND mode. Otherwise, the program continues the taking journal process.

Figure 17:
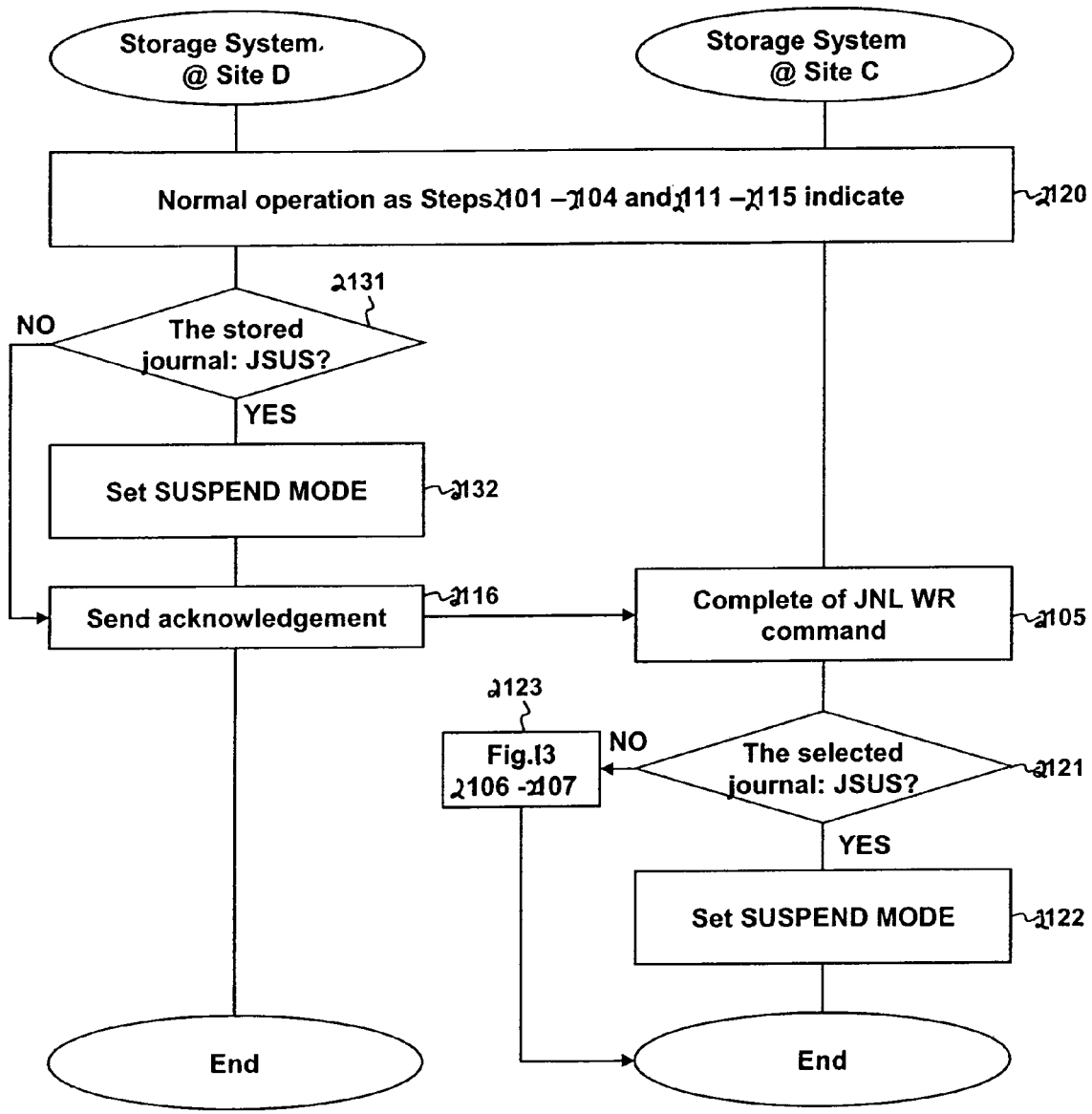
FIG. 17 illustrates a method of suspending the applying and taking journal processes according to one embodiment of the present invention.

FIG. 17 illustrates a method of suspending the applying and taking journal processes according to one embodiment of the present invention. A program at storage system 2050 selects from JNL 2053 the JSUS mark that was transmitted by storage system 2030. Upon recognizing the JSUS mark, the program places the JNL 2053 and SVOLs 2051 and 2052 in a SUSPEND mode. Similarly, storage system 2060 places JNL 2061 in a SUSPEND mode when it reads the JSUS mark as the next journal to be processed. The JSUS mark generally has control or administrative information but no data corresponding to write data.

At step 2120, a journal received from storage system 2050 is processed by storage system 2060 according to the taking journal process. Step 2120 corresponds to steps 2101-2104 and 2111-2115 of FIG. 13. If the program in storage system 2060 determines that the received journal is a JSUS mark rather than a journal with journal data, then the program sets the JNL 2061 to SUSPEND mode (step 2132). Otherwise, the program sends an acknowledgement to storage system 2050 that the journal has been received and processed (step 2116). The program also sends an acknowledgement once JNL 2061 has been placed in a SUSPEND mode.

At step 2105, a program in the storage system 2050 completes the JNL WR command. Thereafter, the program in storage system 2050 checks whether or not if the selected journal is a JSUS mark. If so, then the program goes to step 2122 and places JNL 2053 in a SUSPEND mode. Otherwise, the applying journal process is performed, which corresponds to steps 20106 and 20107 of FIG. 13 (step 2123).

FIG. 18 illustrates converting site C as the production site in place of site A according to one embodiment of the present invention. App 2041 of host 2040 commences sending IOs to SVOLs 2051 and 2052 since site A is under outage. The IOs are used to generate journals. Storage system 2060 at site D restarts the taking journal process to provide synchronous replication.

Figure 19:
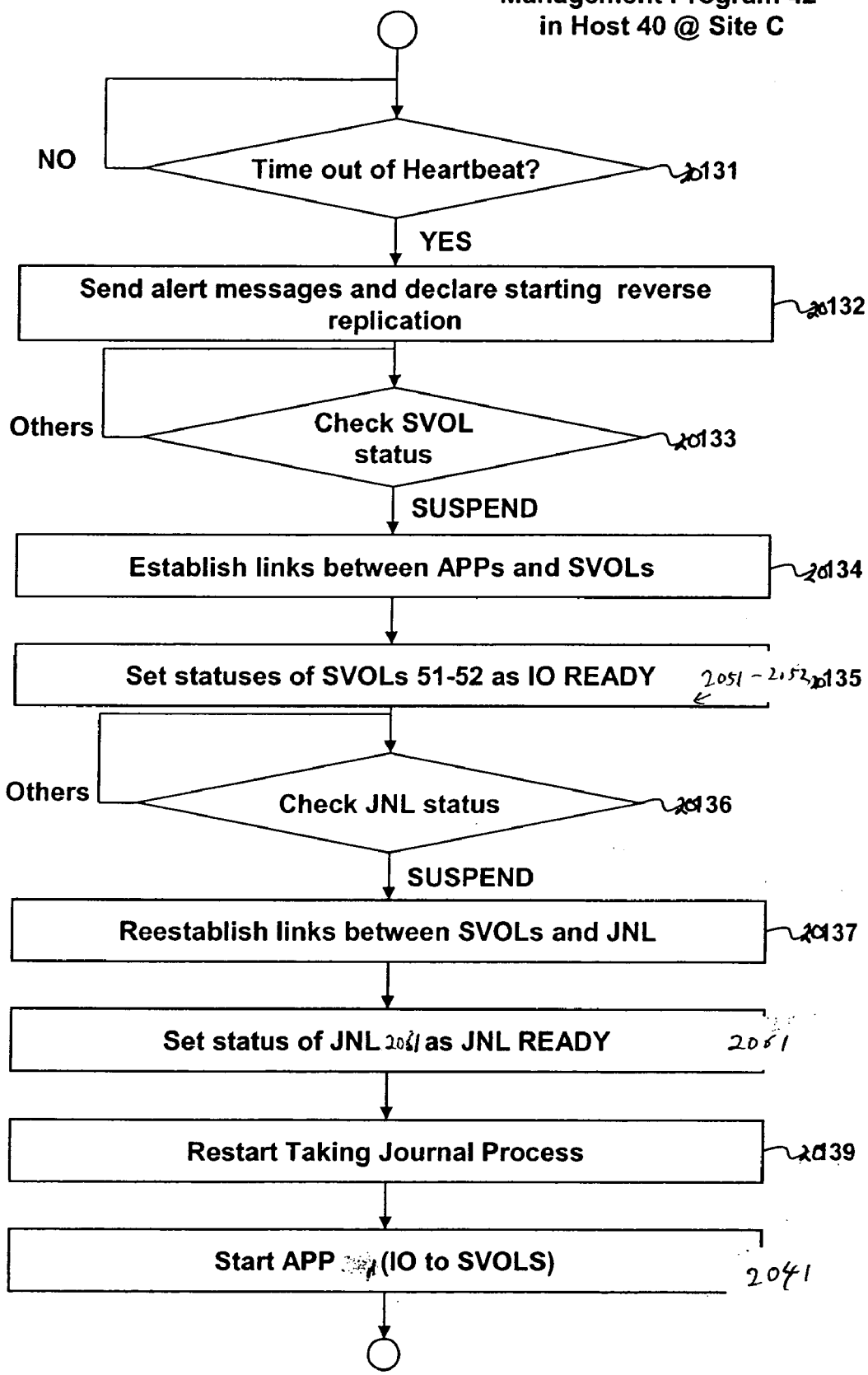
FIG. 19 shows a process used to convert site C as the production site according to one embodiment of the present invention.

FIG. 19 shows a process used to convert site C as the production site according to one embodiment of the present invention. The process is implemented by management program 2042 by calling corresponding microcode programs in storage systems 2050 and 2060.

At step 2131, management program 2042 needs to know whether or not site A is under outage. In a planned outage, host 2010 may send a notification of a planned outage to host 2040. In an unplanned outage, host 2040 determines the occurrence of outage measuring the time elapsed since the last Heartbeat signals was received from host 2010. Hosts 2010 and 2040 each sends and receives Heartbeat signals via communication link 2005 from each other at regular intervals to inform the other that it is online and operational. If host 2040 does not receive a next Heartbeat signal from host 2010 within a given time period since the previous Heartbeat signal, then program 2042 realizes that timeout of Heartbeat has occurred and assumes that host 2010 is under outage. The given time period (or threshold period) may be set according to normal response time between the hosts by an administrator or a program.

At step 2132, if host 2010 is determined to be under outage, management program 2042 sends alert messages to administrators and other management programs at other sites and notify them that host 2010 is under outage. Management program 2042 also declares that it will start production at site C and commence the reverse replication process. In another implementation, management program 2042 asks for permission of other programs or administrator prior to converting itself as the production site.

At step 2133, management program 2042 checks whether or not SVOLs 2051 and 2052 are in SUSPEND mode since the applying journal process may not have yet been suspended. If they are in SUSPEND mode, step 2134 is performed. Otherwise, the program waits until the SVOLs are in SUSPEND mode.

At step 2134, program 2042 establishes links between APP 2041 and SVOLs 2051 and 2052. The statuses of SVOLs 2051 and 2052 are set as IO READY to indicate that they are ready to accept IOs (step 2135).

Management program 2042 checks the status of JNL 2053 to determine whether or not it is in SUSPEND mode (step 2136). If not in SUSPEND mode, the program waits until JNL 2053 is in SUSPEND mode.

Once JNL 2053 is in SUSPEND mode, management program 2042 reestablishes the links between SVOLs 2051 and 2052 and JNL 2061 to enable the taking journal process (step 2137). The taking journal process may be replaced with the transferring journal process involving JNL 2053 and JNL 2061. Program 2042 sets a write pointer in JNL 2061 immediately after the JSUS mark to indicate that the next journal is to be stored in that location.

At step 2138, management program 2042 sets the status of JNL 2061 as JNL READY to indicate that JNL 2061 is ready to take journals. Program 2042 sends a remote command to storage system 2060 for this purpose.

The taking journal process is restarted, so that IOs to SVOLs 2051 and 2052 are taken and stored synchronously in JNL 2061 as journals (step 2139). In the present implementation, the taking journal process may be restarted by management program 2042 at site C. A management program at site D may also be used.

At step 2140, management program 2042 starts APP 2041 and sends IOs to SVOLs 2051 and 2052. In the present implementation, the journals corresponding to these IOs to the SVOLs may be taken without delay since the taking journal was restarted at step 2139.

Figure 21:
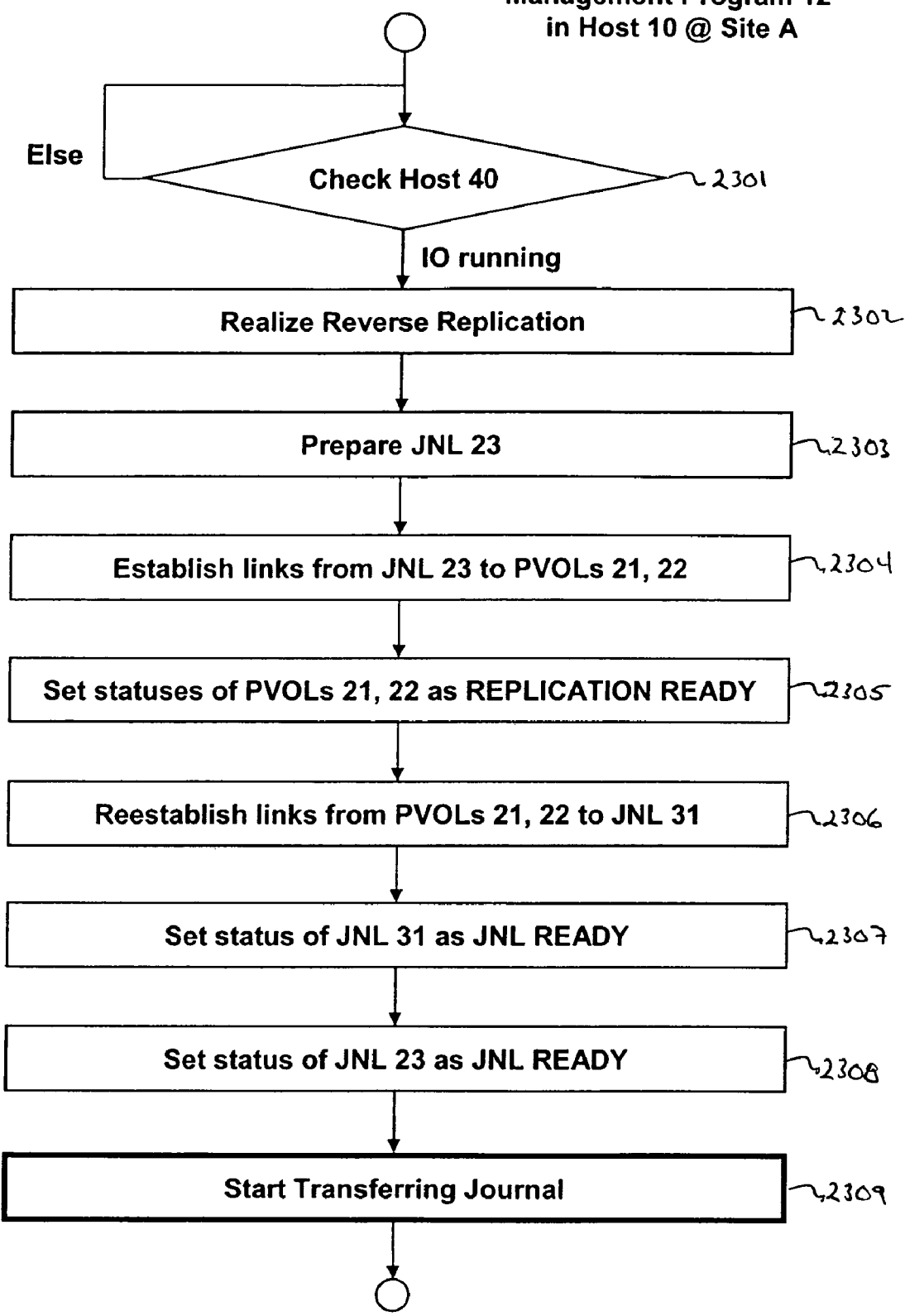
FIG. 21 illustrates steps performed by management program of a storage system to start the transferring journal process according to one embodiment of the present invention.
Figure 22:
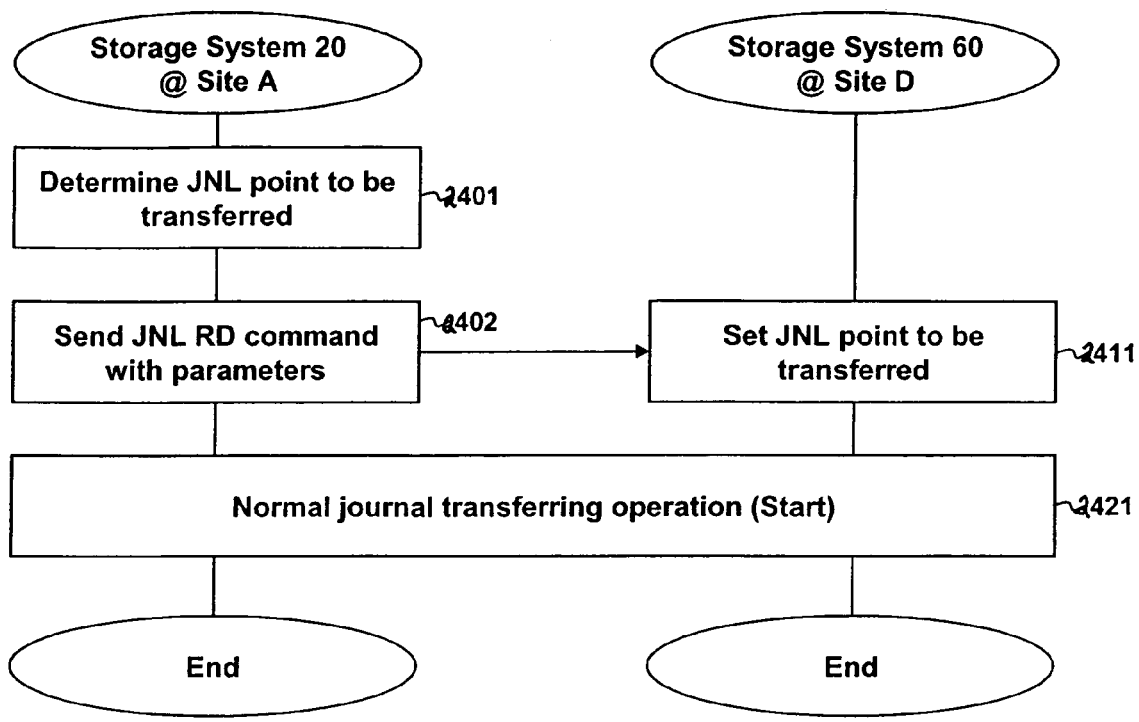
FIG. 22 illustrates a transferring journal process involving certain storage systems according to one embodiment of the present invention.

FIGS. 20, 21, and 22 illustrate a reverse replication processing according to one embodiment of the present invention. As shown in FIG. 20, once site A is online and the outage is over, site A works as a new secondary or recovery site to receive the IOs and journals that have been stored in SVOLs 2051 and 2052 and JNL 2061 while site A was under outage. JNL 2023 at site A is prepared to receive journals from JNL 2061 at site D. These journals are applied to PVOLs 2021 and 2022. A taking journal process is started to take these journals from PVOLs to JNL 2031. The applying journal process and the taking journal process work synchronously in the present implementation. A transferring journal process is initiated to transfer journals from JNL 2061 to JNL 2023. Generally, this asynchronous transferring journal process involving JNLs 2061 and 2023 is performed during a reverse replication flow, but may be done in a forward replication flow.

FIG. 21 illustrates steps performed by management program 2012 of storage system 2020 to start the transferring journal process involving JNL 2023 and JNL 2061 according to one embodiment of the present invention. This may be done by calling corresponding microcode programs in storage systems 2020, 2030, and 2060.

At step 2301, management program 2012 checks the current status of host 2040 and APP 2041. If APP 2041 is running and processing IOs, then program 2012 realizes that a reverse data replication process is being performed (Step 302). Otherwise, program 2012 waits until APP 2041 starts running and processing IOs (This happens if host 2010 restarts before host 2040 starts its failover operation). Alternatively, program 2012 terminates the loop instead of waiting for APP 2041 to start.

At step 2303, management program 2012 prepares JNL 2023 and makes it available as a target JNL to receive journals from JNL 2061. JNL 2023 preferably is defined at the time remote copy system 200 was configured. Program 2012 establishes links between JNL 2023 and PVOLs 2021 and 2022, so that JNL 2023 can serve as a source JNL for applying journals to PVOLs 2021 and 2022 (step 2304).

Program 2012 sets the statuses of PVOLs 2021 and 2022 as REPLICATION READY to indicate that these volumes are ready to serve as target volumes for applying journals from JNL 2023 (step 2305).

At step 2306, program 2012 reestablishes links between PVOLs 2021 and 2022 and JNL 2031 to prepare for the taking journal process. The journals could be copied directly from JNL 2023 to JNL 2031 in certain implementations.

Management program 2012 sets the status of JNL 2031 as JNL READY to indicate that JNL 2031 is ready for taking journal (step 2307). This is done by issuing a remote command to storage system 2030. Program 2012 also sets the status of JNL 2023 as JNL READY to indicate that JNL 2023 is ready for transferring journals (step 2308). Program 2012 starts the transferring journal process (step 2309).

FIG. 22 illustrates a transferring journal process involving storage systems 2020 and 2060 according to one embodiment of the present invention. In the present embodiment, this process is implemented by Management Program 2012. At step 2401, program 2012 determines the JNL pointer that needs to be transferred from JNL 2061 to JNL 2023. The JNL pointer is set to point to the location immediately after the JSUS mark because it is from there the new journals corresponding to IOs from APP 41 are saved.

At step 2402, program 2012 sends a JNL RD command with parameters to storage system 2060. The parameter includes the JNL pointer to identify the new journals that are to be transferred. After storage system 2060 receives and realizes the command with parameters, storage system 2060 (or its management program) sets its JNL pointer according to the received parameters (step 2411). As a result the JNL pointer of storage system 2060 points to an appropriate location of JNL 2061. In the present embodiment, this step is performed remotely by management program 2012 of storage system 2020. At step 2421, the transferring journal process is performed.

Figure 23:
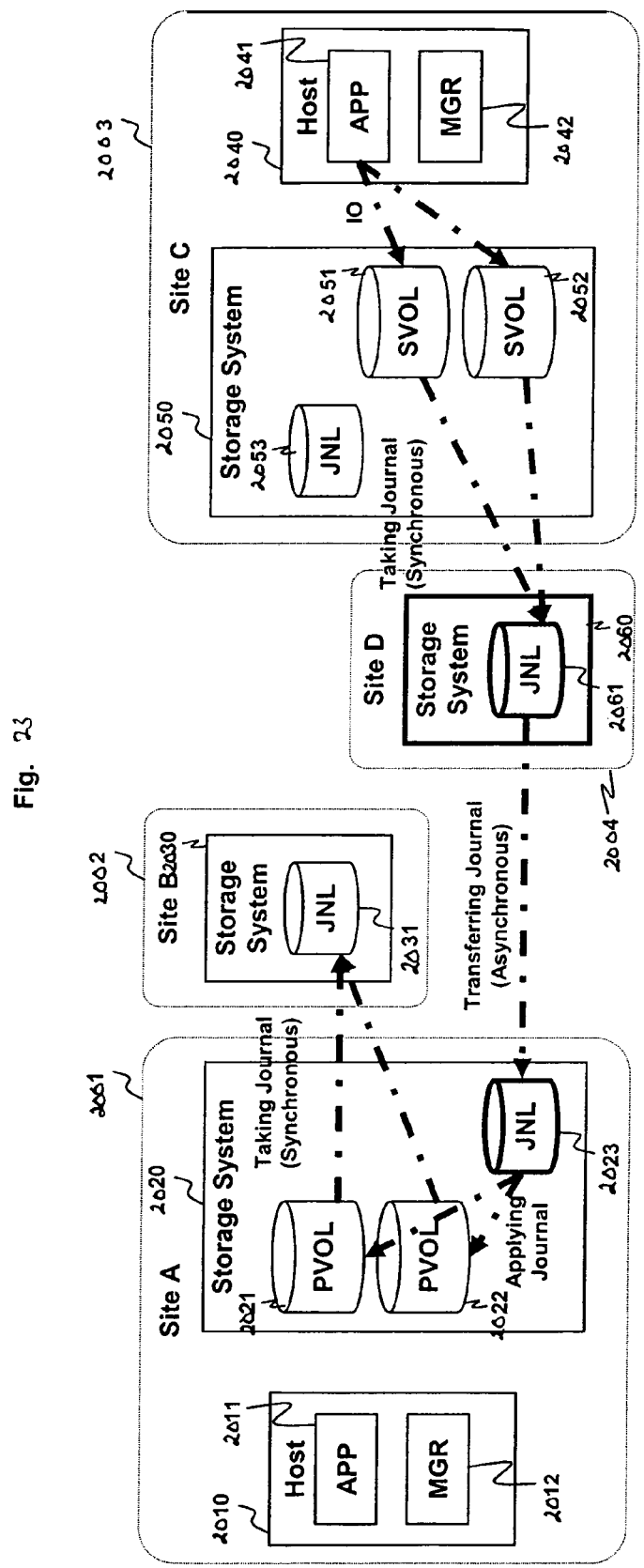
FIG. 23 illustrates a reverse data replication process according to one embodiment of the present invention.

FIG. 23 illustrates a forward data replication process according to one embodiment of the present invention. The process indicates a stable condition after the failover operation is completed. A failback operation is the process of reverting back to the normal operations from the failover operation. The operation is not shown in the figures, but similar to an opposite process of the failover operation. Generally, a planned outage, instead of an unplanned outage like disasters is executed at Site C, and the failback process is safely started without any sudden application shutdown.

Figure 24:
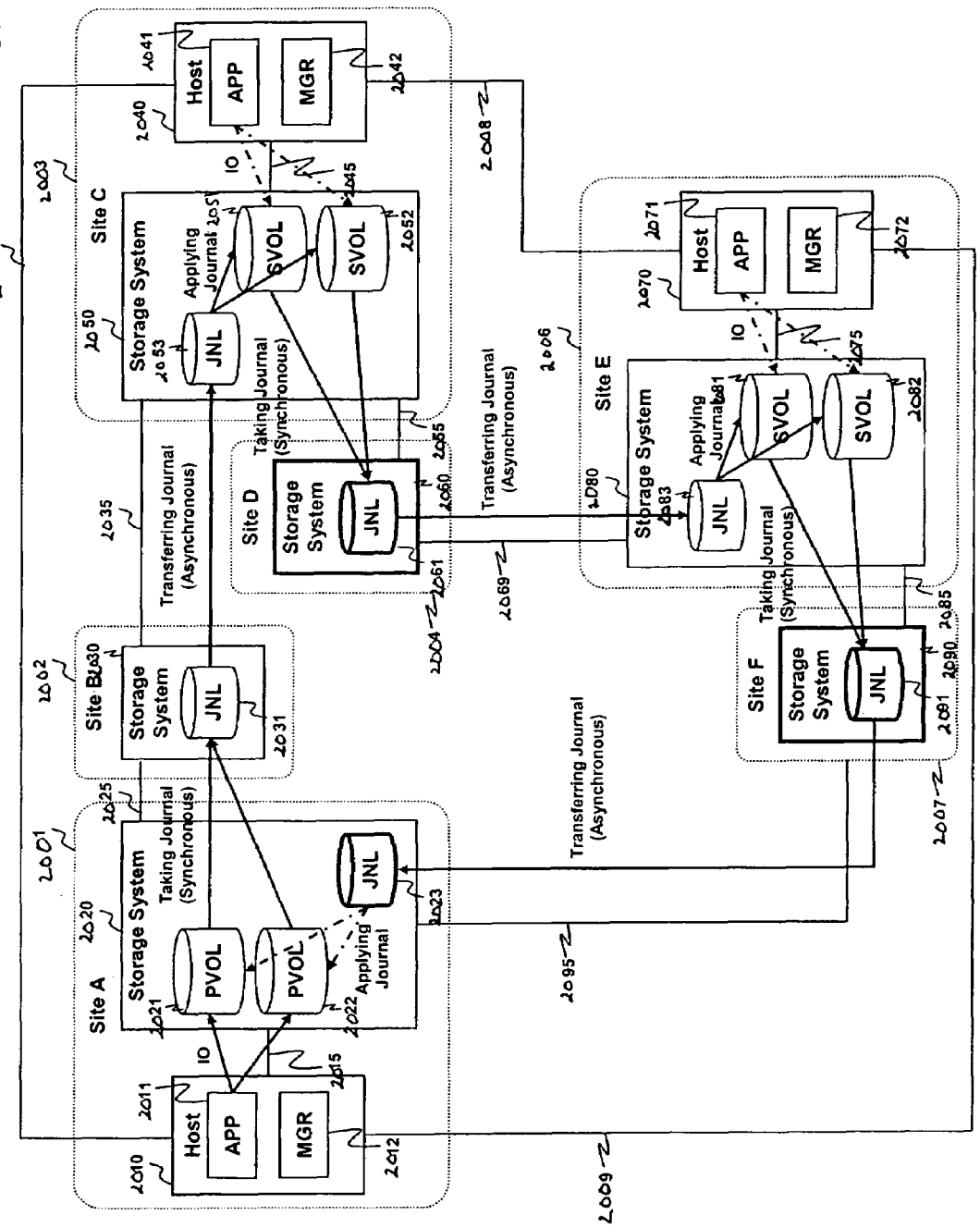
FIG. 24 illustrates a data recovery system having at least six data centers according to one embodiment of the present invention.

FIG. 24 illustrates a remote copy system 2400 having at least six data centers according to one embodiment of the present invention. When compared to the remote copy system of 2000, the present remote copy system 2400 includes two more sites E and F (numerals 2006 and 2007). Site E 2006 includes a storage system 2080 and a host 2070. The storage system 2080 includes SVOLs 2081 and 2082 and a JNL 2083 and is coupled to storage system 2060 via a network or link 2069. Host 2070 includes an Application Program 2071 and Management Program 2072 and is coupled to host 2040 and 2010 via a network or link 2008 and 2009, respectively. A network or link 2075 couples storage system 2080 and host 2070 for I/O requests.

Site F 2007 includes a storage system 2090 which has a JNL 2091. A network or link 2085 couples storage system 2090 and storage system 2080. A network or link 2095, on the other hand, couples storage system 2090 and storage system 2020. In operation, journals are transferred from JNL 2061 of the storage system 2060 to JNL 2083, which are then applied to SVOLs 2081 and 2082. These are then transferred to JNL 2090 at site F. The six data centers in the remote copy system 2400 provides four-data-center capabilities even if a regional natural disaster bring down sites A and B at the same time. In this case, the networks between datacenters need to be established bi-directionally. The journals then may be asynchronously transferred from the JNL volume 2091 to the JNL volume 2053. Also the six-data-center configuration enables journals to be transferred from JNL 2091 to JNL 2023 asynchronously.

Figure 25:
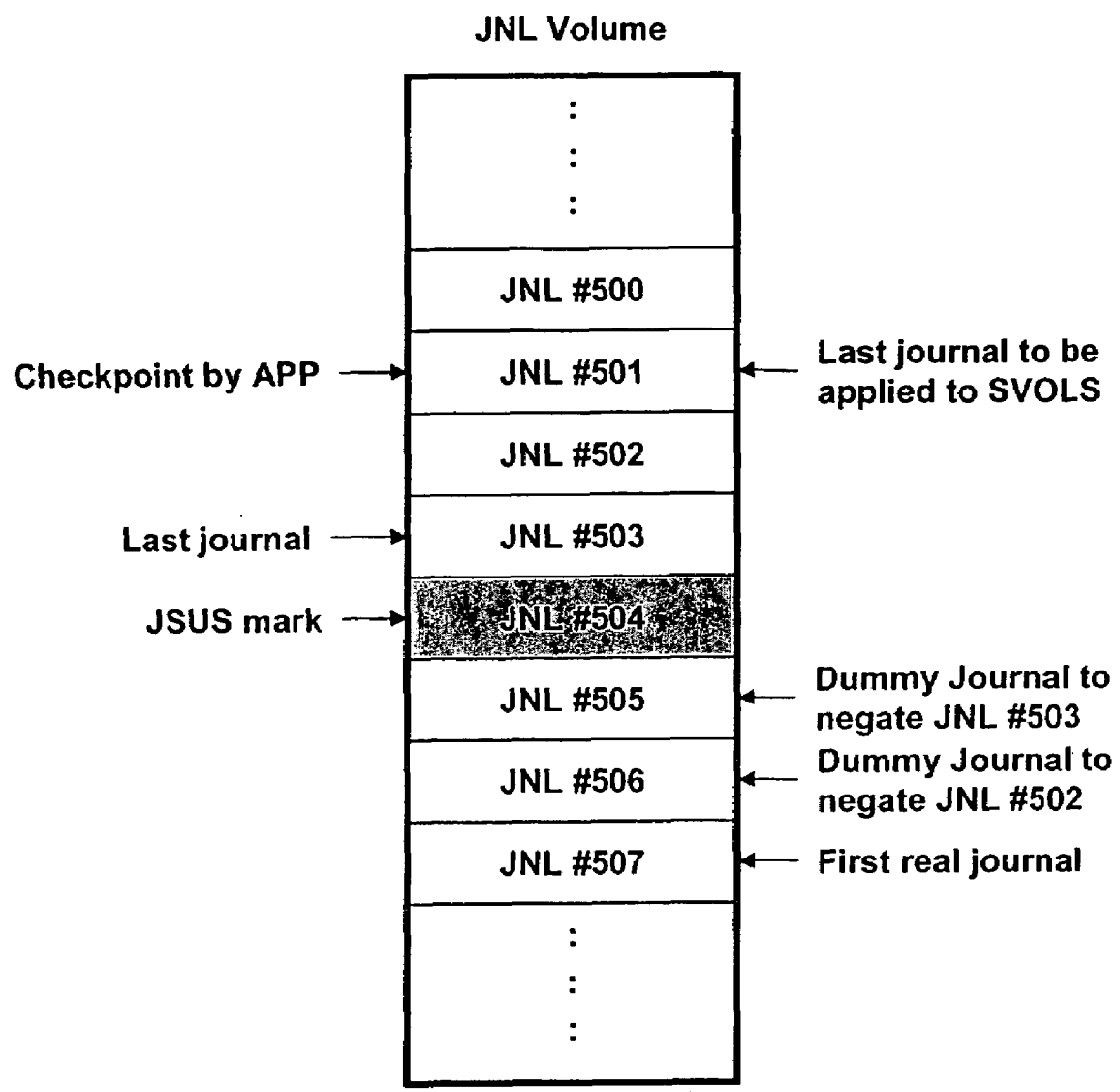
FIG. 25 illustrates a journal volume according to one embodiment of the present invention.

FIG. 25 illustrates a journal volume according to one embodiment of the present invention. Although the embodiments above guarantees no data loss at the recovery site (i.e. site C), not all journals are needed in certain cases for applications to properly recover, particularly if the taking journal process allows an application to enter a checkpoint (or pointer) to the control data of a journal. The application may use this checkpoint as a reference point to recover only journals up to the checkpoint and drop the journals that have been received subsequent to the checkpoint. This may be more commonly used for unplanned outages than planned outages since the application cannot insert the checkpoint at appropriate time in unplanned outages.

Referring back to FIG. 25, a JNL volume includes journals 2500-2507. Journal 2501 is associated with a checkpoint. In the present embodiment, an application enters a checkpoint to the control data of the last IO (or journal) of a given transaction. Journal 2504 is a JSUS mark to indicate that an outage was detected at the primary site. Journals 2502 and 2503 have been received and stored in the JNL volume in between these the checkpoint and JSUS mark. Journals 2505, 2506, and 2507 are new journals that are received after the failover operation has been completed.

Without the checkpoint, all journals preceding the JSUS mark including journals 2502 and 2503 are applied to SVOLs even though the application wants to apply only journals that are within the last checkpoint. Applying journals 2502 and 2503 may not be beneficial since they are incomplete data, i.e., partial data for a given transaction.

Accordingly, management program 2042 creates dummy journals 2505 and 2506 to negate journals 2502 and 2503 received after the last checkpoint. These dummy journals 2505 and 2506, respectively, undo write actions taken in accordance with journals 2502 and 2503.

Figure 26A:
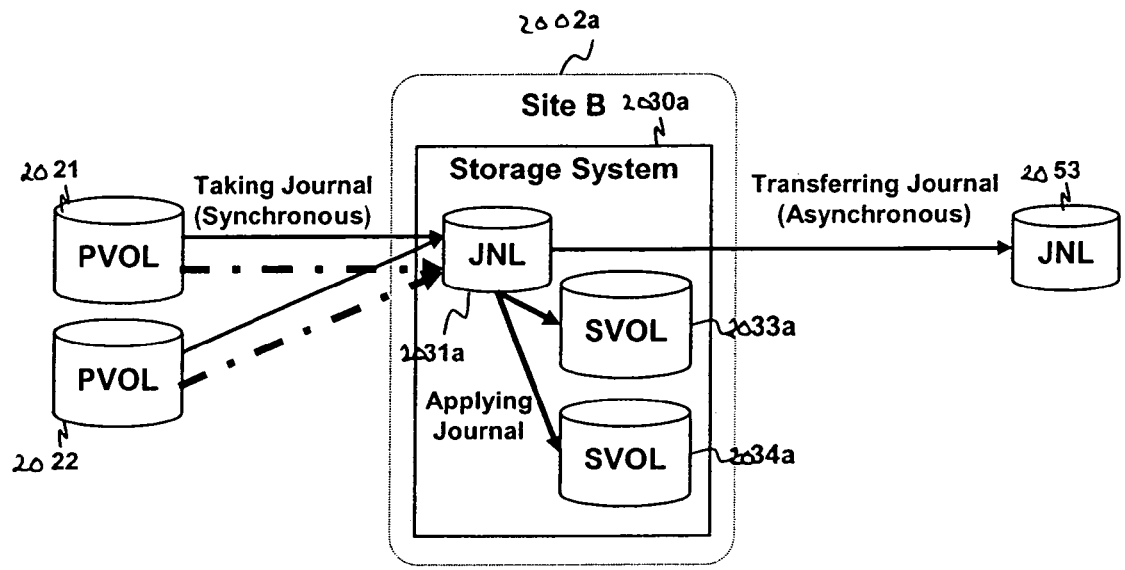
FIGS. 26a and 26b illustrate first and second intermediate sites, each including storage volumes (SVOLs), according to another embodiment of the present invention.
Figure 26B:
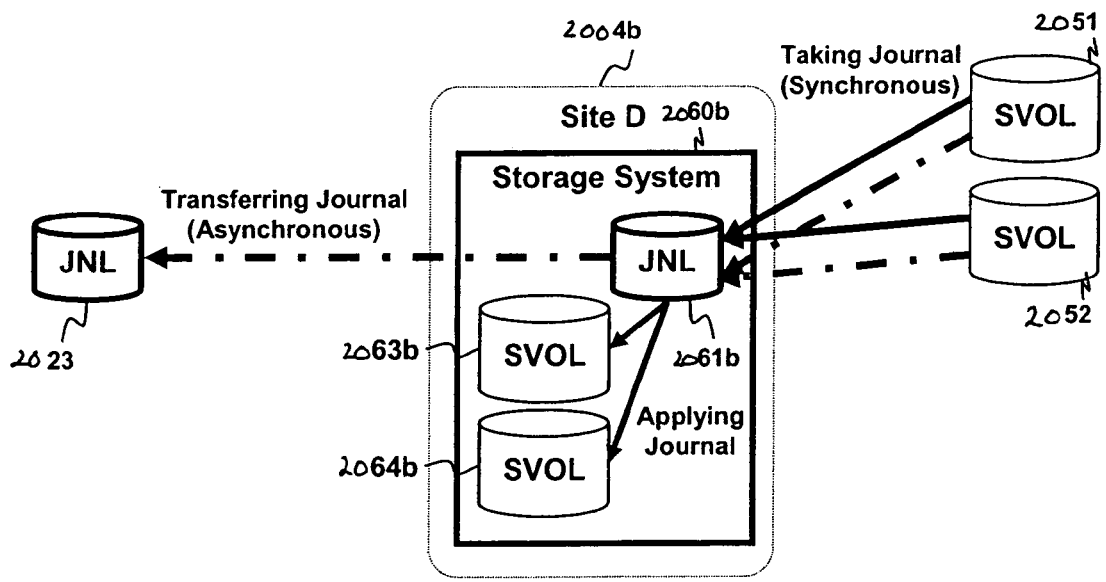

FIGS. 26a and 26b illustrate first and second intermediate sites (sites B and D), each including storage volumes (SVOLs), according to another embodiment of the present invention. In FIG. 26a, storage system 2030a at site B 2002a includes SVOLs 2033a and 2034a that correspond to PVOLs 2021 and 2022, respectively. After the taking journal process is executed synchronously with IOs in forward replication, JNL 2031a is applied to SVOLs 2033a and 2034a asynchronously. In FIG. 26b, storage system 2060b at site D 2004b includes SVOLs 2063b and 2064b that correspond to SVOLs 2051 and 2052, respectively. After the taking journal process is executed synchronously with IOs in reverse replication, JNL 2061b is applied to SVOLs 2063b and 2064b asynchronously. The SVOLs at the first and second intermediate sites provide added data protection and enables these sites to serve as recovery sites if both sites A and B experience failure. Alternatively, only one of the storage systems 2030a and 2060b may be provided with SVOLs.

Figure 27:
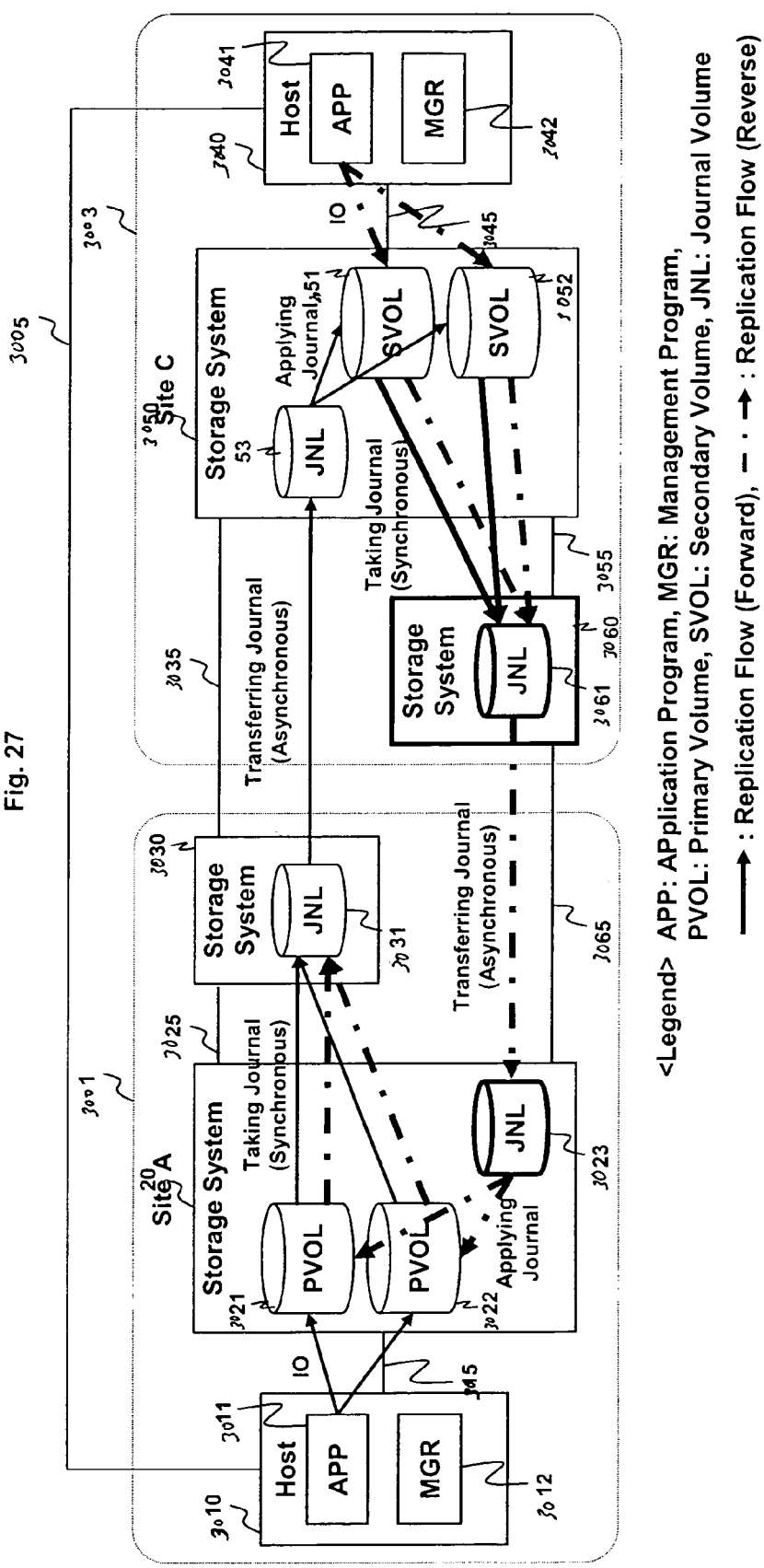
FIG. 27 illustrates a remote copy system including two data centers coupled by one or more network switches that are configured to temporarily store data according to another embodiment of the present invention.

FIG. 27 illustrates a remote copy system including two data centers coupled by one or more network switches configured to temporarily store data according to one embodiment of the present invention. The remote copy system includes a site A 3001 and site B 3002. Each site may refer to a building, a single floor in the same building, or a given area on the same floor. Alternatively, a site may refer to a relatively close geographic region, e.g., a region within a 10 mile radius.

Site A 3001 is a primary site where primary application programs run. Site A 3001 includes a host 3010 and a storage system 3020, which are connected through a storage network 3015. Host 3010 includes Application Program (APP) 3011 and Management Program (MGR) 3012. Application Program 3011 generates IO requests that are transmitted to storage system 3020. There can be several application programs running on the host. Management Program 3012 manages the remote copy operation associated with storage system 3020. Storage system 3020 includes a plurality of Primary Volumes (PVOLs) 3021 and 3022 and a Journal Volume (JNL) 3023.

An intermediary storage system 3030 is also provided at site A. Intermediary storage system 3030 is connected to storage system 3020 via a storage network 3025. Examples of the storage network 3025 are FibreChannel, FICON, ESCON, FCIP, iFCP, iSCSI and so on. Storage system 3030 includes a JNL 3031 that stores updates from host 3010 to PVOLs 3021 and 3022. PVOLs 3021 and 3022 may be in the same consistency group in one embodiment. JNL 3031 stores journals, each including journal data and control data that correspond to the update. Site B may or may not have a host depending on implementations. Storage systems 3020 and 3030 are placed close enough to execute a synchronous remote copy operation without noticeably effecting the IOs processing at site A, i.e., with minimal effect on IO processing capabilities.

Site B is a secondary or recovery site that performs recovery or backup operations when a planned or unplanned outage occurs at site A (or the primary site). Sites A and B are placed sufficiently far enough to prevent both sites A and B from being damaged at the same time due to regional disasters, e.g., earthquake, fire, and typhoon, and so on. Site B includes a host 3040, a storage system 3050, and a network 3045 coupling host 3040 and storage system 3050. Host 3040 includes Application Program (APP) 3041 and Management Program (MGR) 3042. Storage system 3050 includes a plurality of Secondary Volumes (SVOLs) 3051 and 3052 and a Journal Volume (JNL) 3053.

An intermediary storage system 3060 including a JNL 3061 is also provided at site B. JNL 3061 stores journals from JNL 3053 or SVOLs 3051 and 3052 of storage system 3050. JNL 3061 is used during a reverse replication operation, as explained below. A network or link 3065 couples storage systems 3060 and 3020.

A communication link 3005 couples hosts 3010 and 3040, so that Heartbeat signals may be exchanged between host 3010 and host 3040. In implementation, the communication link or Heartbeat link is IP based.

The present invention has been described in terms of specific embodiments and are not limited to the embodiments disclosed above. Numerous modification and variations may be made to the above embodiments without departing from the scope of the present invention. For example, sites A and C may both function as primary and secondary sites at the same time. Some systems may use site A as the primary site and site C as the secondary site, whereas other systems may use site C as the primary site and site A as the secondary site. Accordingly, the scope of the present invention is defined by the appended claims.

What is claimed is:

1. A remote copy system, comprising: a first storage system including a first storage controller and a first data volume, the first storage controller being configured to control data access requests to the first data volume, the first storage system being configured to store write data in the first data volume upon receiving a write request from a first host that is associated with the first storage system;
    a second storage system including a second data volume and configured to receive first copy data sent from the first storage system and store the first copy data in the second data volume, the first copy data corresponding to the write data stored in the first data volume;
    a third storage system including a second storage controller and a third data volume and configured to receive second copy data from the second storage system and store the second copy data to the third data volume, the second copy data corresponding to the first copy data, the third data volume mirroring the first data volume;
    a fourth storage system including a fourth data volume and configured to receive third copy data sent from the third storage system and store the third copy data to the fourth data volume, the third copy data corresponding to the second copy data and configured to perform a reverse replication operation wherein the reverse replication operation includes
    realizing at the first storage system that the third storage system has been converted to a production site;
    establishing links between the first storage controller and the first data volume located in the first storage system;
    reestablishing a link between the first and the second storage systems;
    determining a storage controller pointer to be transferred between the fourth data volume and the first storage controller based on a JSUS mark;
    including a journal in the first storage system to receive a transfer of a journal process from a journal of the fourth storage system;
    transferring a journal process between the journal of the fourth storage system and a journal of the first storage system;
    applying the journal process to the first data volume, and synchronously taking a journal process to a journal of the second storage system;
    wherein the first storage system and the second storage system are placed close enough to execute a synchronous remote copy operation with minimal impact on IO processing capabilities;
    wherein the second storage system and the third storage system are placed sufficiently far apart to prevent both the second and third storage systems from damage at the same time due to a regional disaster;
    wherein the third storage system and the fourth storage system are placed close enough to execute a synchronous remote copy operation with minimal impact on IO processing capabilities at the first storage system;
    wherein the fourth storage system and the first storage system are placed sufficiently far apart to avoid both the fourth and first storage systems from being destroyed at the same time due to a regional disaster; and
    wherein storing the write data to the first data volume and sending the first copy data to the second storage system are performed synchronously, wherein the second storage system transmits the second copy data to the third storage system asynchronously from the storing the write data to the first data volume.

2. The remote copy system of claim 1, wherein the first data volume is a primary storage volume to store production data, the second and fourth data volumes are journal volumes to store journals, and the third data volume is a secondary storage volume to mirror the first storage volume and provide data redundancy,
    wherein the second storage system receives a journal corresponding to the write data from the first storage system, the journal including control data and journal data, the first copy data being the journal data, and
    wherein the third storage system receives the journal from the second storage system and stores the journal in a journal volume provided in third storage system, the third storage system applying the journal to the third data volume, so that the third data volume can store the second copy data and mirror the first data volume, the second copy data corresponding to the journal data of the journal.

3. The remote copy system of claim 1, wherein the second copy data are stored synchronously with sending the third copy data to the fourth storage system.

4. The remote copy system of claim 1, wherein the first, second, third, and fourth storage systems are located in first, second, third, and fourth sites, respectively.

5. The remote copy system of claim 1, wherein the first and second storage systems are provided in a first site and the third and fourth storage systems are provided in a second site,
wherein the first storage system transmits the first copy data to the second storage system synchronously with the write request received from the first host, and the second storage system transmits the second copy data to the third storage system asynchronously with the write request received from the first host.

6. The remote copy system of claim 1, wherein the first data volume is a primary storage volume to store production data, the second and fourth data volumes are journal volumes to store journals, and the third data volume is a secondary storage volume to mirror the first storage volume and provide data redundancy,
wherein the journal volumes are first-in-first-out storage devices.

7. The remote copy system of claim 6, wherein each of the journal volumes includes a control data area and a journal data area, the control data area being configured to store only control data and the journal data area being configured to store only journal data, each of the journals including control data and journal data.

8. The remote copy system of claim 1, further comprising:
a second host coupled to the third storage system, wherein the third storage system is configured to function as a primary storage system if the first storage system is offline for longer than a given time period.

9. The remote copy system of claim 1, wherein the first data volume is a primary storage volume to store production data, the second and fourth data volumes are journal volumes to store journals, and the third data volume is a secondary storage volume to mirror the first storage volume and provide data redundancy,
wherein the second storage system receives a journal corresponding to the write data from the first storage system, the journal including control data and journal data, the first copy data being the journal data,
wherein the third storage system receives the journal from the second storage system and stores the journal in a journal volume provided in third storage system, the third storage system applying the journal to the third data volume, so that the third data volume can store the second copy data and mirror the first data volume, the second copy data corresponding to the journal data of the journal,
wherein the second storage system assumes that the first storage system is under outage and initiates a failover procedure if the second storage system does not receive a write command from the first storage system for longer than a given period.

10. The remote copy system of claim 9, wherein the second storage system sends a SUSPEND mark to the third storage system, the third storage system preparing for the failover procedure upon recognizing the SUSPEND mark received from the second storage system,
wherein the third storage system sends the SUSPEND mark to the fourth storage system, the fourth storage system putting the fourth data volume in a SUSPEND mode upon recognizing the SUSPEND mark received from the third storage system.

11. The remote copy system of claim 1, wherein a second host coupled to the third storage system, wherein the third storage system is configured to function as a primary storage system if the first storage system is under outage,
wherein the second host including a management program that is operable to initiate a failover procedure to convert the third storage system to the primary storage system if the management program determines the first host of the first storage system has not sent a status signal within a given time period.

12. The remote copy system of claim 11, wherein a management program of the first host prepares for a reverse replication operation if the management program of the first host determines that second host is sending a write request to the third storage system, the management program of the first host preparing a fifth data volume provided in the first storage system to receive data from the fourth data volume of the fourth storage system.

13. The remote copy system of claim 12, wherein the first storage system sends a read command to the fourth storage system, the read command including a pointer pointing to a storage location of data first received from the second host after the failover operation has been effectuated.

14. The remote copy system of claim 13, wherein the pointer is generated using a SUSPEND mark issued by the second storage system.

15. The remote copy system of claim 10, wherein a dummy journal generated by a management program is processed to negate a write operation performed according to a journal received after the SUSPEND mark.

16. A method for operating a remote copy system having a first storage system with a first primary volume and first journal volume, a second storage system with a second primary volume and second journal volume, a third storage system with a third primary volume and third journal volume, and a fourth storage system with a fourth primary volume and fourth journal volume, the method comprising:
at the first storage system realizing that the third storage system has been converted to a production site;
establishing links between the first journal volume and the first primary volume located in the first storage system;
reestablishing a link between the first and the second storage systems;
determining a journal volume pointer to be transferred between the fourth journal volume and the first journal volume based on a JSUS mark;
transferring a journal process between the fourth journal volume and the first journal volume;
applying the journal process to the first primary volume, and synchronously taking a journal process into the second journal volume;
wherein the first storage system and the second storage system are placed close enough to execute a synchronous remote copy operation with minimal impact on IO processing capabilities;
wherein the second storage system and the third storage system are placed sufficiently far apart to prevent both the second and third storage systems from damage at the same time due to a regional disaster;
wherein the third storage system and the fourth storage system are placed close enough to execute a synchronous remote copy operation with minimal impact on IO processing capabilities at the first storage system;

wherein the fourth storage system and the first storage system are placed sufficiently far apart to avoid both the fourth and first storage systems from being destroyed at the same time due to a regional disaster; and wherein first data communication between the first and second storage systems is based on a synchronous remote copy method, and second data communication between the second and third storage systems is based on an asynchronous remote copy method, and third data communication between the third and fourth storage systems is based on a synchronous remote copy method.

17. The method of claim 16, wherein the second storage system receives a first journal associated with the write data from the first storage system, the first journal including first control data and first journal data, the write data corresponding to the first journal data, wherein the first copy request corresponds to a second journal sent to the third storage system by the second storage system, the second journal including the second control data and second journal data, the second journal data corresponding to the first journal data.

18. The method of claim 17, further comprising:

transmitting a third journal including third control data and third journal data from the third storage system to the fourth storage system, the third journal corresponding to the second journal data, the third journal corresponding to the second copy request, wherein first data communication between the first and second storage systems is based on a synchronous remote copy method, and second data communication between the second and third storage systems is based on an asynchronous remote copy method, and third data communication between the third and fourth storage systems is based on a synchronous remote copy method.

19. A computer readable medium including a computer program for operating a remote copy system having a first storage system with a first primary volume and first journal volume, a second storage system with a second primary volume and second journal volume, a third storage system with a third primary volume and third journal volume, and a fourth storage system with a fourth primary volume and fourth journal volume, the computer program comprising:

a code for realizing at the first storage system that the third storage system has been converted to a production site;

a code for establishing links between the first journal volume and the first primary volume located in the first storage system;

a code for reestablishing a link between the first and the second storage systems;

a code for determining a journal volume pointer to be transferred between the fourth journal volume and the first journal volume based on a JSUS mark;

a code for transferring a journal process between the fourth journal volume and the first journal volume;

a code for applying the journal process to the first primary volume, and synchronously taking a journal process into the second journal volume; and wherein the first storage system and the second storage system are placed close enough to execute a synchronous remote copy operation with minimal impact on IO processing capabilities;

wherein the second storage system and the third storage system are placed sufficiently far apart to prevent both the second and third storage systems from damage at the same time due to a regional disaster;

wherein the third storage system and the fourth storage system are placed close enough to execute a synchronous remote copy operation with minimal impact on IO processing capabilities at the first storage system;

wherein the fourth storage system and the first storage system are placed sufficiently far apart to avoid both the fourth and first storage systems from being destroyed at the same time due to a regional disaster; and wherein first data communication between the first and second storage systems is based on a synchronous remote copy method, and second data communication between the second and third storage systems is based on an asynchronous remote copy method, and third data communication between the third and fourth storage systems is based on a synchronous remote copy method.

20. A storage system provided in a remote copy system, wherein the remote copy system includes a first storage system with a first primary volume and first journal volume, a second storage system with a second primary volume and second journal volume, a third storage system with a third primary volume and third journal volume, and a fourth storage system with a fourth primary volume and fourth journal volume, the storage system comprising:

a storage unit including a plurality of storage disks that define a plurality of storage volumes;

a storage controller to control access to the storage unit;

a communication interface coupled to a network; and a computer readable medium including a computer program for operating the storage system, the computer program including:

a code for realizing at the first storage system that the third storage system has been converted to a production site;

a code for establishing links between the first journal volume and the first primary volume located in the first storage system;

a code for reestablishing a link between the first and the second storage systems;

a code for determining a journal volume pointer to be transferred between the fourth journal volume and the first journal volume based on a JSUS mark;

a code for transferring a journal process between the fourth journal volume and the first journal volume;

a code for applying the journal process to the first primary volume, and synchronously taking a journal process into the second journal volume;

wherein the first storage system and the second storage system are placed close enough to execute a synchronous remote copy operation with minimal impact on IO processing capabilities;

wherein the second storage system and the third storage system are placed sufficiently far apart to prevent both the second and third storage systems from damage at the same time due to a regional disaster;

wherein the third storage system and the fourth storage system are placed close enough to execute a synchronous remote copy operation with minimal impact on IO processing capabilities at the first storage system;

wherein the fourth storage system and the first storage system are placed sufficiently far apart to avoid both the fourth and first storage systems from being destroyed at the same time due to a regional disaster; and wherein first data communication between the first and second remote storage systems is based on a synchronous remote copy technology, and second data communication between the second remote storage system and the storage system is based on an asynchronous remote copy technology, and third data communication between the storage system and the third remote storage system is based on a synchronous remote copy technology.

21. The storage system of claim 20, wherein the first copy request is generated by the second remote storage system based on a journal received from the first remote storage system.

22. The storage system of claim 20, wherein first data communication between the first and second remote storage systems is based on a synchronous remote copy method, and second data communication between the second remote storage system and the storage system is based on an asynchronous remote copy method, and third data communication between the storage system and the third remote storage system is based on a synchronous remote copy method, wherein the second remote storage system receives a first journal associated with the write data from the first remote storage system, the first journal including first control data and first journal data, the write data corresponding to the first journal data, wherein the first copy request corresponds to a second journal send to the storage system by the second remote storage system, the second journal including the second control data and second journal data, the second journal data corresponding to the first journal data.

* * * * *